United States Patent
Brisk et al.

(10) Patent No.: US 10,360,336 B2
(45) Date of Patent: Jul. 23, 2019

(54) MICROFLUIDICS PLANAR PLACEMENT AND ROUTING ALGORITHM

(71) Applicant: The Regents of the University of California, Oakland, CA (US)

(72) Inventors: Philip Brisk, Riverside, CA (US);
Brian Crites, Riverside, CA (US);
Jeffrey McDaniel, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/794,957

(22) Filed: Oct. 26, 2017

(65) Prior Publication Data
US 2018/0121590 A1    May 3, 2018

Related U.S. Application Data

(60) Provisional application No. 62/413,922, filed on Oct. 27, 2016.

(51) Int. Cl.
| | |
|---|---|
| G06F 17/50 | (2006.01) |
| B01L 3/00 | (2006.01) |
| B81C 99/00 | (2010.01) |
| B01J 19/00 | (2006.01) |

(52) U.S. Cl.
CPC ...... G06F 17/5072 (2013.01); B01J 19/0093 (2013.01); B01L 3/502707 (2013.01); B81C 99/006 (2013.01); *B01L 2200/12* (2013.01); *B01L 2300/0816* (2013.01); *G06F 2217/02* (2013.01)

(58) Field of Classification Search
CPC .................................................. G06F 17/5072

USPC .......................................................... 716/119
See application file for complete search history.

(56) References Cited

U.S. PATENT DOCUMENTS

2002/0108096 A1* 8/2002 Lee .................. B01F 15/00935
716/30

OTHER PUBLICATIONS

Grimmer, Andreas, et al., "Close-to-Optimal Placement and Routing for Continuous-Flow Microfluidic Biochips", *Design Automation Conference (ASP-DAC)*. 2017 22nd Asia and South Pacific, (2017), 6 pgs.

Kuratowski, Casimir, "Sur le probléme des courbes gauches en Topologie [On the problem of skew curves in topology]", (w/ English Translation), ICM, *Fundamenta Mathematicae* 15.1, (1930), 271-283, and 1-13 (translation).

(Continued)

*Primary Examiner* — Suresh Memula
(74) *Attorney, Agent, or Firm* — Schwegman Lundberg & Woessner, P.A.

(57) ABSTRACT

A method of developing a physical design layout of microfluidic system chip can include receiving a planarized graph of a netlist including vertices representing microfluidic components. The vertices can be expanded into components, where each component includes a first dimension and a second dimension. The components can be shifted to a position where the first and second dimension of each component do not overlap with the first dimension and the second dimension of any other component. A flow route can be determined based on the first and second dimension of each component and the position of each component, the flow route including channels connecting two or more of the components.

20 Claims, 25 Drawing Sheets

(56) References Cited

OTHER PUBLICATIONS

Lin, Chun-Xun, et al., "An Efficient Bi-criteria Flow Channel Routing Algorithm for Flow-based Microfluidic Biochips", *Design Automation Conference (DAC), 2014 51st ACM/EDAC/IEEE*,(2014), 6 pgs.

McDaniel, Jeffrey, et al., "Flow-Layer Physical Design for Microchips Based on Monolithic Membrane Valves", *IEEE Design& Test*, 32(6), (2015), 51-59.

McDaniel, Jeffrey, et al., "Simulated Annealing-based Placement for Microfluidic Large Scale Integration (mLSI) Chips". *2014 22nd International Conference on Very Large Scale Integration (VLSI-SoC)*, (2014), 6 pgs.

Tseng, Tsun-Ming, et al., "Columba 2.0: A Co-Layout Synthesis Tool for Continuous-Flow Microfluidic Biochips", *IEEE Transactions on Computer-Aided Design of Integrated Circuits and Systems*, (2017), 14 pgs.

Tseng, Tsun-Ming, et al., "Columba: Co-Layout Synthesis for Continuous-Flow Microfluidic Biochips", *2016 53nd ACM/EDAC/IEEE Design Automation Conference (DAC)*, (2016), 6 pgs.

Wang, Qin, et al., "Sequence-Pair-Based Placement and Routing for Flow-Based Microfluidic Biochips", *2016 21st Asia and South Pacific Design Automation Conference (ASP-DAC)*, (2016), 6 pgs.

Yao, Hailong, et al., "Integrated Flow-Control Codesign Methodology for Flow-Based Microfluidic Biochips", *IEEE Design & Test*, (Jun. 23, 2015), 60-68.

\* cited by examiner

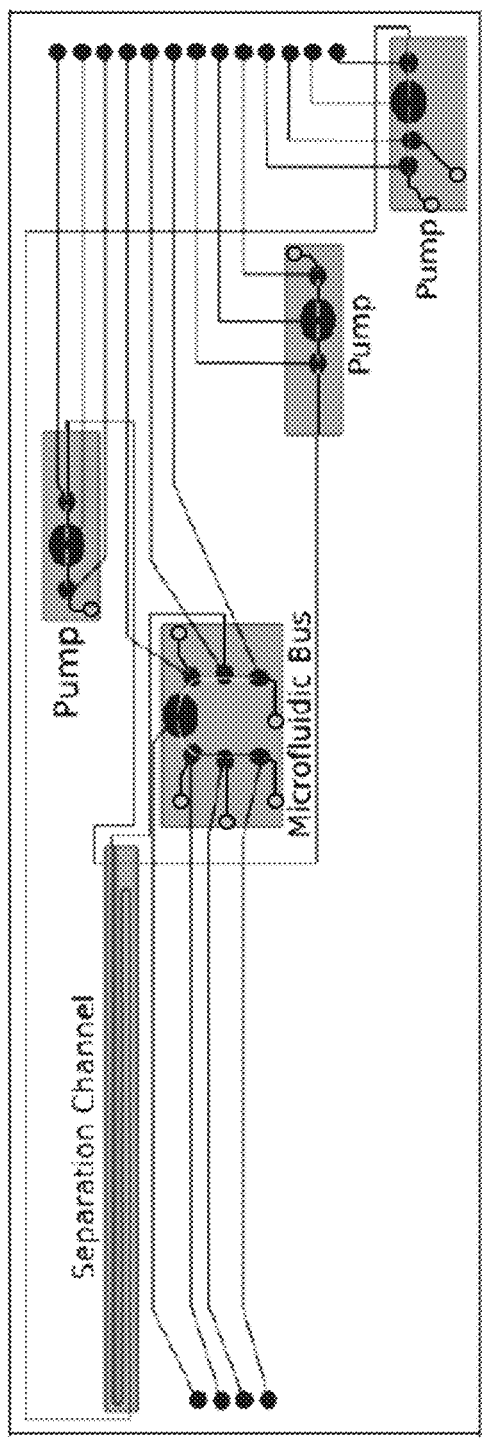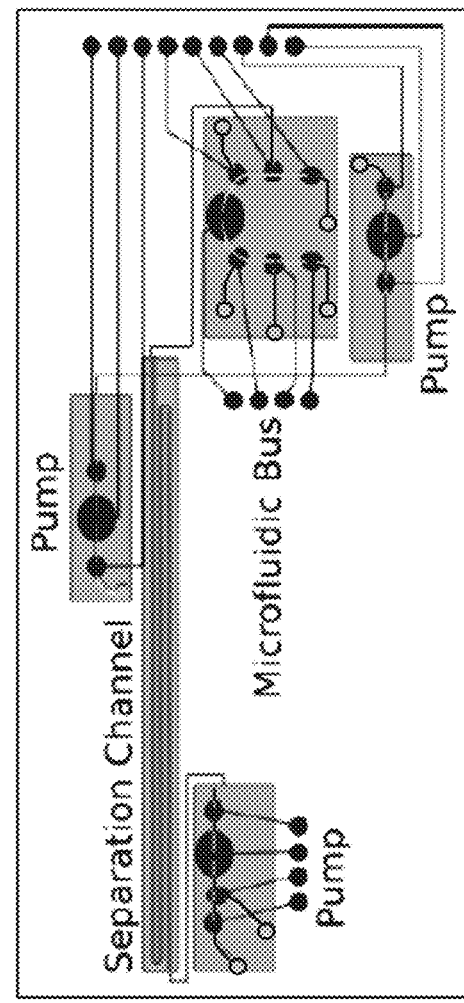
FIG. 5A
FIG. 5B

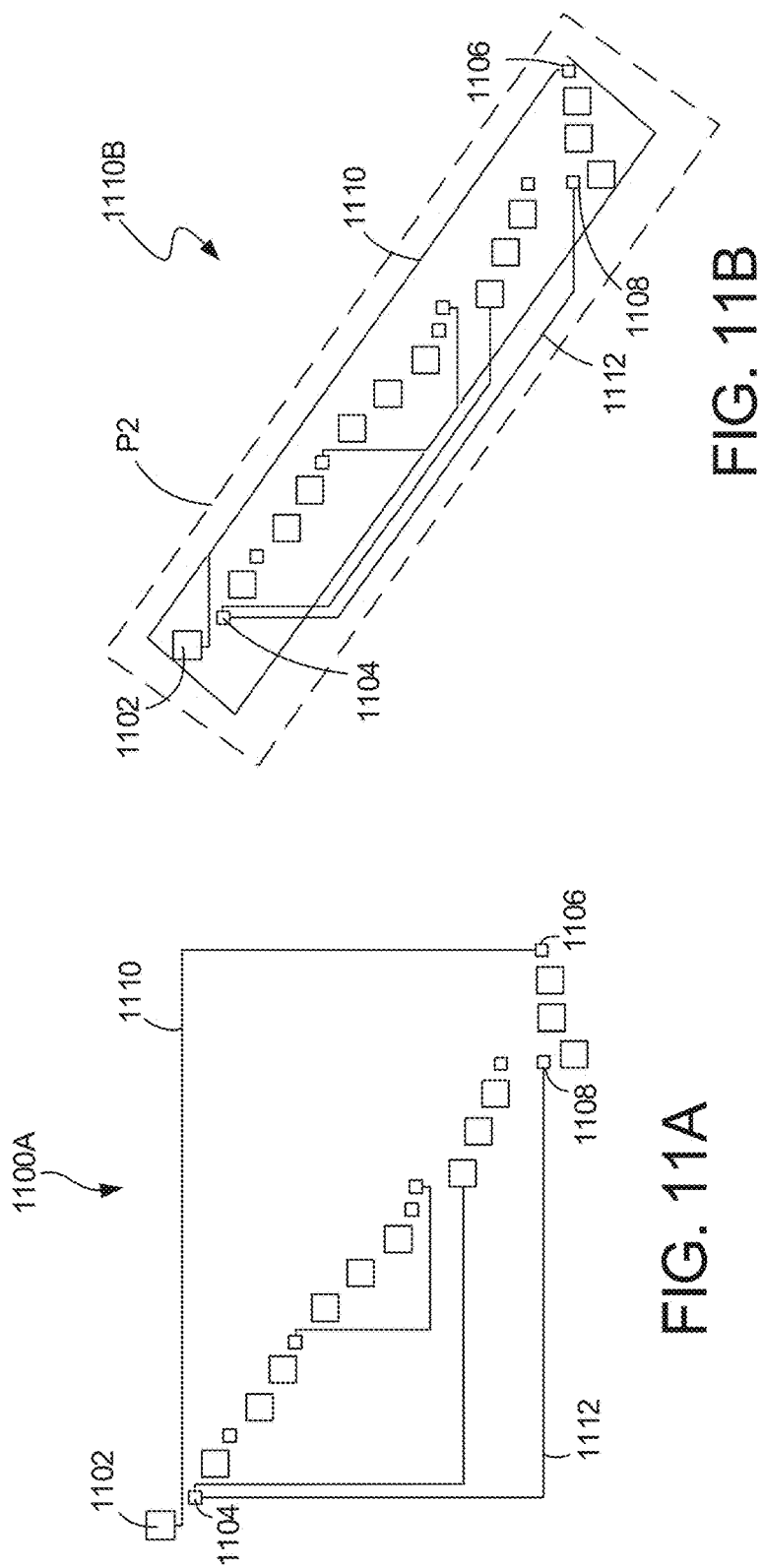

MICROFLUIDICS PLANAR PLACEMENT AND ROUTING ALGORITHM

RELATED APPLICATION AND PRIORITY CLAIM

This application is related and claims priority to U.S. Provisional Application No. 62/413,922, filed on Oct. 27, 2016 and entitled "PLANAR PLACEMENT AND ROUTING ALGORITHM FOR FLOW-BASED MICROFLUIDICS," the entirety of which is incorporated herein by reference.

STATEMENT OF GOVERNMENT SPONSORED SUPPORT

The subject matter herein was developed with Government support under Grant (or Contract) Nos. 1351115, 1536026, and 1540757, awarded by the by National Science Foundation. The Government has certain rights to the subject matter herein.

BACKGROUND

Microfluidic fluid technologies relate to fluid particles typically smaller than one millimeter. Microfluidic devices are devices supporting flow of fluids at this scale and can be useful to manipulate fluids due to the fluid properties, such as the Reynolds number of the fluids. Microfluidic devices are commonly used for processing fluids for processing of fluids, such as bodily fluids. Because microfluidic devices are so small. They are expensive to manufacture and design.

OVERVIEW

This disclosure presents several methods and systems incorporating an automated toolchain that can convert a netlist representation of the flow layer microvalve-based Laboratories-on-a-chip (LoC) into a physical layout that can be fabricated.

LoCs based on integrated microvalve technology have been developed for a variety of biochemical applications, including low-cost point-of-care testing and detection of organic matter on the planet Mars. LoCs can offer the benefits of higher throughput, lower sample/reagent usage, and reduced likelihood of human error compared to some other chemistry methods. Often, microvalve-based LoCs are designed and physically laid out by hand, which can create a high barrier to entry for any scientist who requires a new device to perform an experiment. This can be particularly arduous for scientists who are not device experts, and/or lack relevant training on synergistic topics such as semiconductor VLSI design and layout.

The present disclosure discusses, among other things, methods and systems to provide a physical design layout of microfluidic system chip using a netlist representation of a flow layer for microvalve-based LoC. The disclosure discusses methods for planarizing the netlist (and/or confirming planarization of the netlist). The planarized netlist can be used to develop a planar graph embedding including vertices representing microfluidic components and channels or routes representing microfluidic flow channels. The vertices can be oriented to avoid overlap and crossing of channels and can also be expanded. When the vertices are expanded they can be expanded in a manner avoiding overlap. Expansion of vertices into components can require rerouting of channels to avoid intersections between channels and undesired intersections between channels and components.

In some examples, a flow routing layer can be used to determine a flow route or channel route for one or more channels. In some examples, channel routing can be constrained by a perimeter defined through placement of the components. In some examples, ordering of the components or vertices can be used to efficiently expand and place the components and to efficiently route the channels between the components.

In another example, a method of developing a physical design layout of microfluidic system chip can include receiving a planarized graph of a netlist including vertices representing microfluidic components. The vertices can be expanded into components, where each component includes a first dimension and a second dimension. The components can be shifted to a position where the first and second dimension of each component do not overlap with the first dimension and the second dimension of any other component. A flow route can be determined based on the first and second dimension of each component and the position of each component, the flow route including channels connecting two or more of the components.

BRIEF DESCRIPTION OF THE DRAWINGS

FIG. 5A is a schematic view of a microfluidic system in a first condition, in accordance with at least one embodiment of the present disclosure.

FIG. 5B is a schematic view of a microfluidic system in a second condition, in accordance with at least one embodiment of the present disclosure.

FIG. 11A is a schematic view of a portion of a microfluidic system in a first condition, in accordance with at least one embodiment of the present disclosure.

FIG. 11B is a schematic view of a portion of a microfluidic system in a second condition, in accordance with at least one embodiment of the present disclosure.

DESCRIPTION OF EMBODIMENTS

LoCs based on integrated microvalve technology have been developed for a variety of biochemical applications, including low-cost point-of-care testing and detection of organic matter on the planet Mars. Through automation and miniaturization, LoCs offer the benefits of higher throughput, lower sample/reagent usage, and reduced likelihood of human error compared to traditional bench-top chemistry methods. These chips can be viewed as miniaturized plumbing networks that have been shrunk down to the micron scale and below. A typical microvalve based chip is comprised of two layers: a flow layer, which transports fluid; and, a control layer, which delivers externally-supplied pneumatic pressure to open and close microvalves as needed. Often, microvalve-based LoCs are designed and physically laid out by hand. This can create a high barrier to entry for any scientist who requires a new device to perform an experiment. The biochemical research must be put on hold while the LoC is designed, laid out, and fabricated. This is particularly arduous for scientists who are not device experts, and lack relevant training on synergistic topics such as semiconductor VLSI design and layout. This disclosure discusses methods and systems for automating the design process of these LoCs.

Figure 1A:
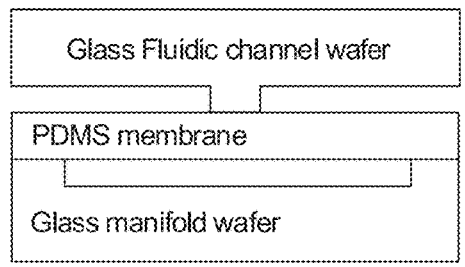
FIG. 1A is a cross-sectional elevation view of a valve of a microfluidic system in a first state, in accordance with at least one embodiment of the present disclosure.

Some widely recognized microvalve technologies use elastomeric valves based on multi-layer soft lithography and monolithic membrane valves. Though the systems and methods disclosed are technology independent, monolithic membrane valves are discussed as examples, as shown in FIG. 1. LoCs based on monolithic membrane valves are built using two glass plates that sandwich a thin layer of polydimethylsiloxane (PDMS), a flexible and inert organic polymer. Etched channels in the two glass plates respectively provide distinct layers for fluid flow and pneumatic control. The biochemical reaction executes on the flow layer, while the control layer delivers pressure to each microvalve to control fluids in the flow layer. Monolithic membrane vales are normally closed, as illustrated in FIG. 1A.

Figure 1B:
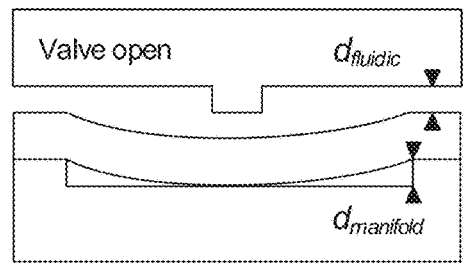
FIG. 1B is a cross-sectional elevation view of the valve of FIG. 1 in a second state, in accordance with at least one embodiment of the present disclosure.
Figure 1C:
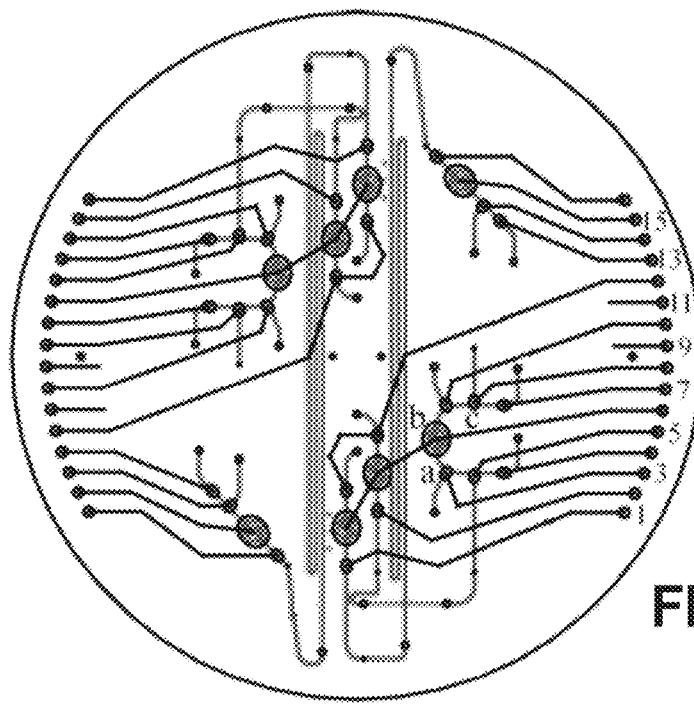
FIG. 1C is a schematic view of a microfluidic system, in accordance with at least one embodiment of the present disclosure.
Figure 1D:
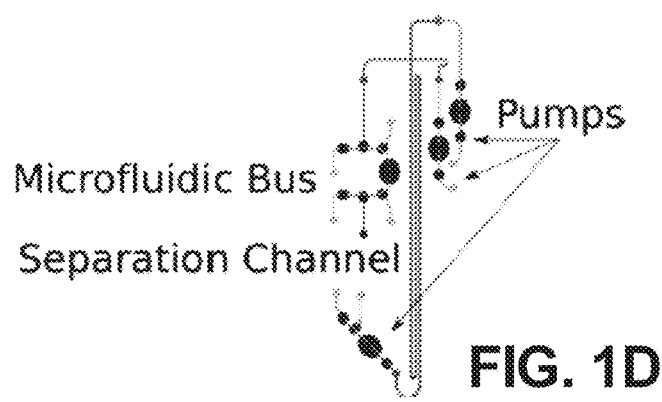
FIG. 1D is a schematic view of a portion of a microfluidic system, in accordance with at least one embodiment of the present disclosure.

Applying a vacuum through a control channel deflects the membrane, which opens the valve, and allows fluid to flow through, as shown in FIG. 1B. The Mars Organic Analyzer (MOA), shown in FIG. 1C, is a representative LoC built using monolithic membrane valves. Both the fluid flow and control layers of the MOA were designed and physically laid out by hand. The MOA contains two copies of the same basic analysis system for the purpose of fault tolerance and redundancy. FIG. 1D depicts the fluid flow layer (control lines removed) of one of the two analysis systems, specifically a single component extracted from the chip.

Section 1, Methods and Systems for Developing A Physical Flow Design

In some examples of this disclosure, a biological experiment can be specified using a domain-specific language suitable for the chosen technology; architectural synthesis, which includes scheduling, resource allocation, and binding steps, converts this specification into a graph-based netlist (plumbing network) capable of executing the experiment. If desired, the netlist can be converted to the Microfluidic Hardware Description Language (MHDL), which is human readable representation. MHDL is extensible, allowing the user to describe both the technology and architectural entities within their own respective library files.

The methods and systems of this disclosure address the next step, which is to automatically convert the MHDL or netlist representation of the LoC architecture into a physical layout of the fluid flow layer. Having one layer for fluid flow imposes the constraint that only planar LoC architectures can be realized in this technology. It is possible to planarize a non-planar architecture by inserting microvalves to act as switches at fluid channel intersection points; however, doing so is problematic because additional external control lines are required to actuate the switches. The number of external control lines is typically limited as a design rule, and adding more control lines tends to reduce reliability after fabrication. To simplify this issue, physical design for planar LoC architectures are considered.

Simulated annealing is based on randomization and iterative improvement, but does not guarantee a planar layout, even if the netlist being placed is planar. Simulated annealing could be used as a post-processing step to reduce the area or fluid channel length of a pre-computed planar layout, while ensuring that the optimized layout remains planar as a constraint. The methods of this disclosure eschew randomization, for post-processing, while ensuring by construction that the resulting layout remains planar.

The planar layout for the fluid flow layer can be converted to a Scalable Vector Graphic (SVG) file, which can be used to create a mask that produces patterns for etched channels in one of the two glass layers. After laying out the fluid flow layer, an SVG file can be manually laid out and produced for the pneumatic control layer as well. To fabricate a fully integrated device, separate SVG files may be required for the fluid flow and pneumatic control layers. A working toolflow that can produce both flow and/or control layer designs is an apparent need in the industry.

Figure 2:
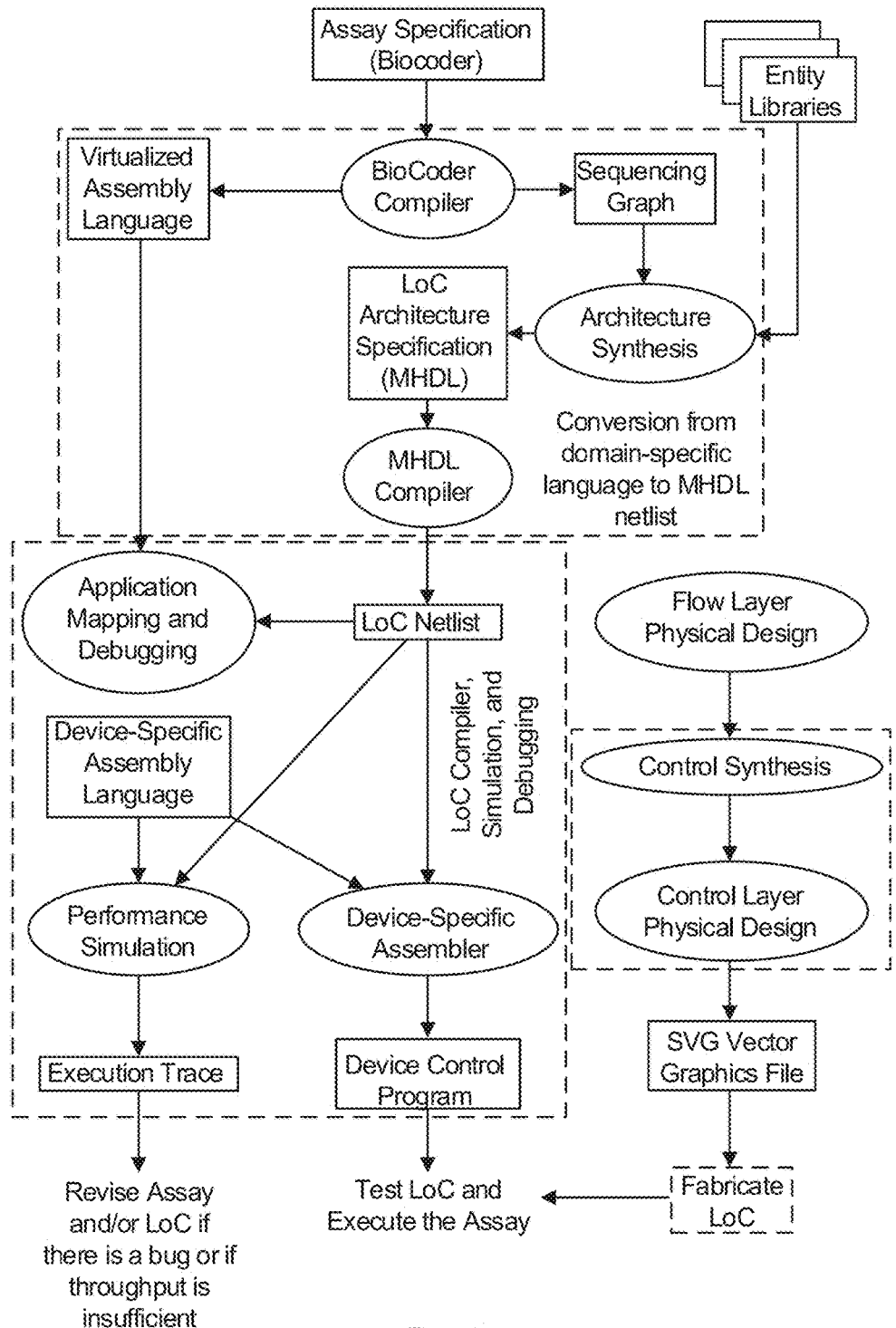
FIG. 2 is a flow diagram of a method of producing a microfluidic system file, in accordance with at least one embodiment of the present disclosure.

FIG. 2 illustrates the main stages of one example of software toolflow. To make the system flexible and extensible, technology library files are used to specify the available LoC technologies and their corresponding entities. Extensibility allows device engineers to continuously extend toolflow whenever they develop new technologies and/or entities. The technology library file describes fabrication constraints, while the entity library files specify the capabilities and constraints of each component. During component expansion, in which vertices (points) in the netlist are replaced with two-dimensional microfluidic components, the placer obtains the dimensions of each component from its entity library file. The router ensures the routing channels are aligned with each entity's ports and ensures proper spacing to allow for legal fabrication.

An input for a physical design algorithms of some examples is a planar netlist of components and their fluidic connections, a description of the target technology, and the entities to be used. The netlist can be generated from an MHDL specification or from a synthesis tool starting from a high-level domain-specific language, as shown in FIG. 2. The netlist can be initially treated as a graph in which vertices are points, as opposed to physical components that have two-dimensional areas. The netlist can then be placed using a straight line planar embedding algorithm. Nodes are then expanded from points to two-dimensional components, based on their entity types. Flow channels between components can then be routed using a modified variant of an established semiconductor VLSI router. Lastly, a post-processing step adjusts the placement solution and incrementally reroutes the chip in order to reduce area and fluid routing channel length.

Planar Embedding

Component placement can start by computing a straight-line planar embedding. The netlist can be represented as a graph $G=(V, E)$, where V is a set of components (without dimensions and/or area) and E is a set of fluid channels connecting components. In some examples, the Boyer-Myrvold method can be applied to make G fully connected and to test for planarity. In other examples, other methods and/or algorithms can be used to test G for planarity and to planarize G.

If G is planar, then it can be transformed to be biconnected and maximally planar. The vertices $v_i \in V$ are then ordered canonically, which enables linear time computation of a straight-line planar embedding of the netlist on a $(2|V|-4) \times (|V|-2)$ grid. Algorithm 1 shown below presents an example of pseudocode that includes Chrobak-Payne straight line embedding from a Boost library. The function calls shown here are representative of Boost library calls.

Algorithm 1

```
Require: G := (V;E) an undirected graph
Ensure: G := (V;E) with each v_i ∈ V placed
  1:     G := make_connected(G)
  2:     if !boyer_myrvold_planarity_test(G) then
  3:        exit( )
  4:     G := make_biconnected_planar(G)
  5:     G := make_maximal_planar(G)
  6:     X := planar_canonical_ordering(G)
  7:     G := chrobak_payne_straight_line(G;X)
```

Component Expansion

Straight-line planar embedding does not account for size or dimensions of components. To create a valid placement, two passes are applied to expand components and remove any overlap between components that may result. The first pass sorts the components $c_i \in C$ by their x coordinate, $x_i$, in ascending order, and expands each component by its width $w_i$. All subsequent components $c_j \in C$, where $j > i$, are shifted in the positive x direction by $w_i$, $x_j = x_j + w_i$. The second pass of the expansion applies the same steps along the y-axis, while expanding and shifting components based on their heights, rather than their widths. Component expansion cannot preserve the straight-line planar embedding property, illustrated in FIG. 3. Additionally, there is no direct mechanism to assign fluid channels to ports on the perimeter of each component. A flow layer router, described next, addresses these challenges.

Flow Layer Routing

The next step is to instantiate a routing grid $R=(U; F)$, where U is a set of grid points, and F is a set of edges representing potential channel routes between adjacent grid points. For each component $c_i \in C$ a vertex $u_i$ for the ports $p_h \in P_i$ is instantiated and added to U. A grid of vertices is then instantiated in the empty space between components. Pseudocode is presented below in Algorithm 2.

Algorithm 2

```
Require: C := set of components in the netlist
Require: max x; max y := the maximum x and y values in the plane
Ensure: R := (U; F) grid of vertices
  1:     for all c_i ∈ C do
  2:        for all p_h ∈ c_i do
  3:           U ← U ∪ u_i = (p_h.x; p_i.y)
  4:     for all 0 < x < max_x do
  5:        for all 0 < y < max_y do
  6:           if !withincomponent(x, y) then
  7:              U ← U ∪ u_i = (x; y)
  8:     for all 0 < x < max x do
  9:        for all 0 < y < max y do
 10:           u_i ← (x; y)
 11:           F ← F ∪ get_south_neighbor(u_i)
 12:           F ← F ∪ get_east_neighbor(u_i)
```

In lines 11 and 12, edges that represent potential routing channel segments are added to F by instantiating a bidirectional edge $f_i$ with a capacity of 1 between $u_i' \in U$ and $u_j' \in U$ if and only if $(u_j.x - u_i.x = 1) \oplus (u_j.y - u_i.y = 1)$.

The network flow model ensures that no edge is used more than once. To ensure that no vertex is used more than once, each vertex $u_i \in U$ is split into $u_i'$ and $u_i''$ and a directed edge $f_i = (u_i', u_i'')$ is added to F. All incoming edges to $u_i$ are forced into $u_i'$, and all outgoing edges from $u_i$ leave through $u_i''$. Hence, any fluid channel that routes through $u_i'$, must use edge $f_i$. The edge capacity constraint ensures that at most one such channel may use the vertex.

Network Flow Model

The next step is to route channels between the components using a network flow routing method based on. Components are processed in order, and un-routed channels that are incident on each component are routed together. Special nodes (super sources, super sinks and sink groups) are added to the routing problem to enable the network flow to simultaneously route and perform port assignment, if necessary. A network flow algorithm (Algorithm 3, below) can be derived from the source component $c_i$ to its set of sink components Ti in the following manner.

Algorithm 3

```
1. Create a super sink u_supersink.
2. For each t_j ∈ Ti
   (a) Add a vertex us_ink group t_j to U.
   (b) Add an edge f_j = (u_sink_group_tj, u_supersink) to F with capacity 1 and cost 1.
   (c) For each port p_k ∈ P_i of t_j
      i. Add a vertex u_pk to U.
      ii. Add an edge f_pk = (u_sink_group_tj, u_pk ) to F with capacity 1.
3. Create a super source u_supersource.
4. For each port p_j ∈ P_i of c_i.
   i. Add a vertex u_pj to U.
   ii. Add an edge f_pj = (u_supersource; u_pj ) to F with capacity 1.
```

Figure 4B:
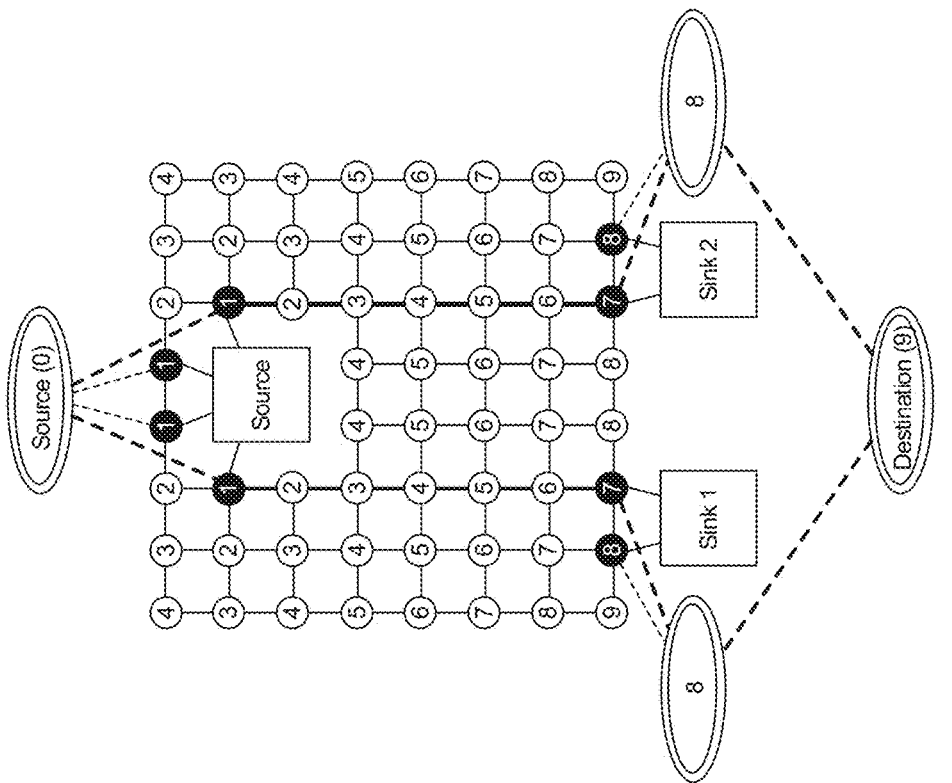
FIG. 4B is a schematic view of a microfluidic system, in accordance with at least one embodiment of the present disclosure.

A set of routes from $c_i$ to all $t_j \in T_i$ is found by computing the maximum flow from $u_{supersource}$ to $u_{supersink}$. The paths computed by the network flow algorithm include port assignment at the source and sinks, and may present multiple valid paths. The path from the port $p_k$ at each sink $t_j$ to its corresponding port $p_j$ at the source component $c_i$ can then be traced, as determined by the solution to the network flow problem, as can be seen in FIG. 4B. This trace back obtains the shortest valid path found. The super source, super sink, and sink groups along with their incident edges are then removed from the routing grid, and the process repeats for the next component.

This approach offers two enhancements to the existing network flow router, which improve routability. First, if a route between components ci and $c_j$ abuts a third component $c_k$ then the ports on $c_k$ may become blocked. To prevent blockage, a buffer zone of a few vertices can be created around each component. Vertices within the buffer zone are removed from the routing grid to prevent port blockage; they are returned to the grid only when routing that component. This ensures that each connection will be able to at least find a port to route out of the component.

Second, routing failures may occur due to fracturing of the routing grid as more connections are routed. If a routing failure occurs, all routes are removed and the queue of components is reordered so that the component that failed to route now routes first; this guarantees that the component will now be able to route. The number of times that the component queue may be reordered can be limited in some examples. In these examples, if this limit is exceeded, a routing failure for the chip can be declared.

Post-Processing

The straight-line planar embedding algorithm discussed above is not cognizant of component dimensions and makes no attempt to reduce the area in terms of grid usage. Methods discussed in examples further below can reduce area and fluid channel length.

As a post-processing step, components placed on the chip's perimeter are reviewed to determine if movement of the components into the interior is possible without sacrificing the planar layout property. One-by-one, modules placed on the perimeter of the chip are selected and are moved in a direction orthogonal to the perimeter with which they are aligned. After a component is moved, its incident channels are rerouted. If a legal route is obtained, then the movement is accepted, otherwise, it is rejected. The process repeats until no further movements that reduce chip are can be found.

In some examples, the physical space on the chip is discretized using a grid graph, as discussed previously. Let N be the number of hops (graph nodes) that a component can be moved in one direction without compromising the (non-routing) legality of the resulting placement. If the resulting route is legal, then stop; otherwise, try again. To ensure rapid convergence, a binary search can be employed. If a legal placement and routing solution is not found at N hops, then a solution can be attempted at N=2 hops, etc. This ensures that a legal placement and routing solution is found for each perimeter component after O(log N) routing attempts. This process repeats until no perimeter components can be moved into the interior of the chip.

Output

In one example of implementation of the methods and systems discussed above, entity library files can be created using components from the original MOA chip. The netlist can be extracted for the MOA and specified it in MHDL. The chip can be run through placement and a router, yielding a workable flow layer; where the pneumatic control layer is manually routed. FIG. 5A shows a resulting device layout. The bounding boxes represent component dimensions used during placement and routing, and were replaced by the actual component image in the SVG file that was generated. A visual inspection indicates that numerous local perturbations to the component layout could reduce chip area and/or fluid routing channel length. FIG. 5B shows the resulting device layout after applying a post-processing step, which yields a more compact planar layout. These results demonstrate the ability of a toolflow to adapt physical design algorithms, originally developed for semi-conductor VLSI, to microvalve-based LoCs.

Section 2, Additional Methods and Systems for Developing a Physical Flow Design

This section discusses various methods and systems for developing a physical flow design for a planar microfluidic device. The methods and systems of this section are primarily directed to vertex (or component) expansion and channel routing.

After an initial planar graph embedding, vertices in the netlist can be expanded into two-dimensional components, followed by fluid channel routing, as discussed above with respect to section 1. Further, a heuristic, Diagonal Component Expansion (DICE) can be introduced for the component expansion step. Compared to a baseline expansion method, DICE can improve area utilization by a factor of about 8.90 times and can reduce average fluid routing channel length by about 47.4 percent.

Overview

This section of the disclosure considers the problem of automated physical design (placement and routing) for the flow layers of microfluidic very large scale integration (mVLSI) chips. At present, both layers are manually designed using software such as SolidWorks or AutoCAD. Manual design is tedious, error-prone, and unlikely to scale as integration densities increase. mVLSI physical design is challenging because components are heterogeneous in terms of size and dimensions and can be placed at any location and with any orientation on the chip. This is distinct from semiconductor VLSI which follows standard design rules and where standard cells have a uniform height and are placed in rows; thus, established physical design techniques cannot easily be adapted for mVLSI technology. LoCs based on continuous fluid flow microfluidics are widely used for a variety of biochemical applications. Through automation and miniaturization, LoCs over the benefits of higher throughput, lower reagent usage, and reduced likelihood of human error compared to traditional benchtop chemistry methods. Although LoCs are widely used for biological research and are starting to gain traction in the diagnostics and biotechnology industries, they presently lack a design science comparable to the rapidly maturing field of electronic design automation (EDA).

Figure 6:
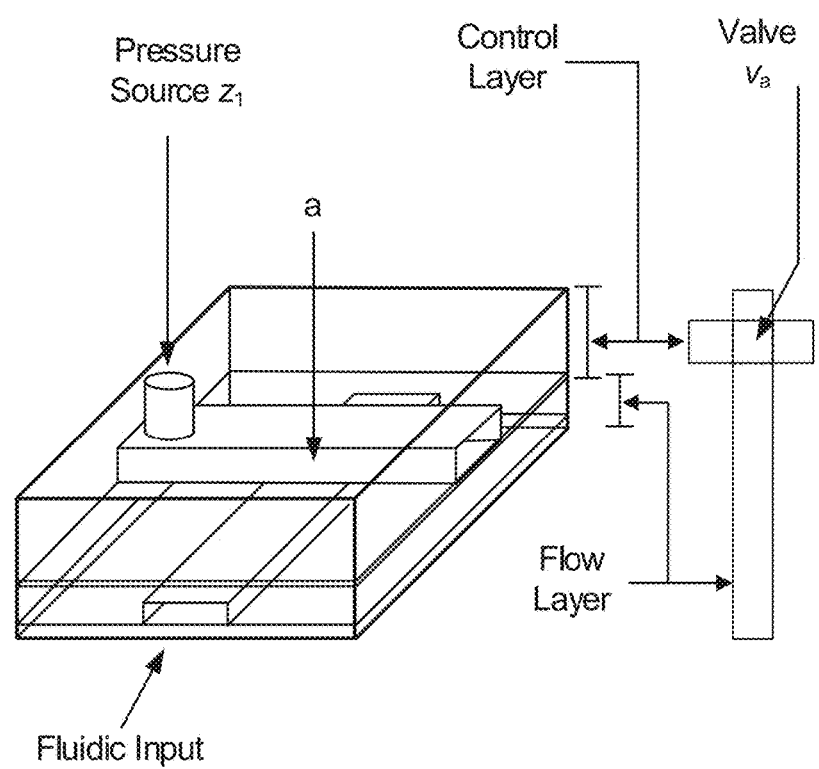
FIG. 6 is an isometric view of a portion of a microfluidic system, in accordance with at least one embodiment of the present disclosure.

Modern LoCs integrate hundreds or thousands of externally controllable microvalves. FIG. 6 illustrates one representative microvalve technology based on multi-layer soft Lithography. Here, two layers of a flexible polymer substrate called polydimethylsiloxane (PDMS) are mounted on top of a rigid substrate (e.g., a glass slide). The flow layer on the bottom manipulates biological fluids of interest, while the control layer above provides actuation capabilities from an external pressure source. The microvalve is formed where a control channel on one layer crosses a flow channel on another layer. By default, all microvalves are open; pressurizing a control channel closes the microvalves that it drives. Larger components, such as pumps, mixers, switches, multiplexers and demultiplexers, memories, etc. can be constructed as an interconnected network of microvalves.

Multi-flow-layer mVLSI chips are not currently viable in most microfluidic applications, requiring that the placement and routing of all flow components and connections be done on a single layer. Since inadvertent fluid mixing would invalidate any biological experiment, it is necessary for the components and channels to not overlap or intersect, a concept in graph theory known as graph planarity.

Figure 7A:
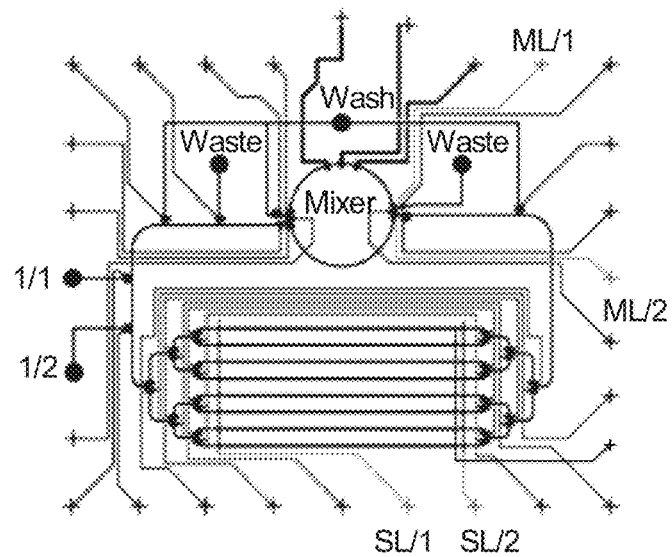
FIG. 7A is a schematic view of a microfluidic system, in accordance with at least one embodiment of the present disclosure.
Figure 7B:
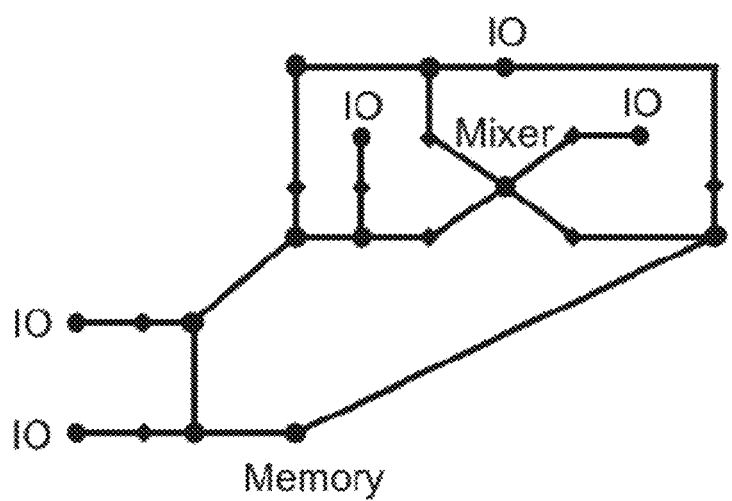
FIG. 7B is a schematic view of a portion of a microfluidic system in a first condition, in accordance with at least one embodiment of the present disclosure.
Figure 7C:
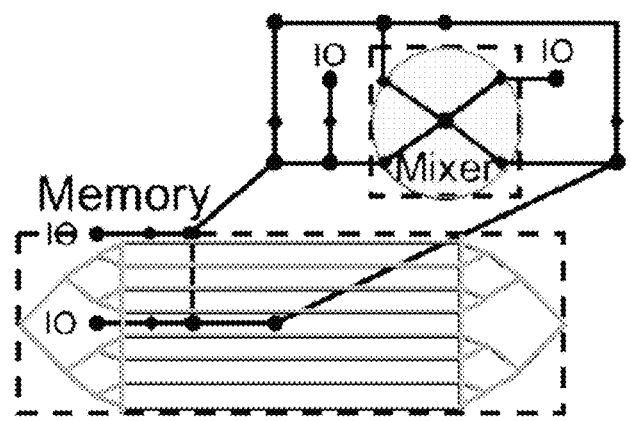
FIG. 7C is a schematic view of a portion of a microfluidic system in a second condition, in accordance with at least one embodiment of the present disclosure.
Figure 7D:
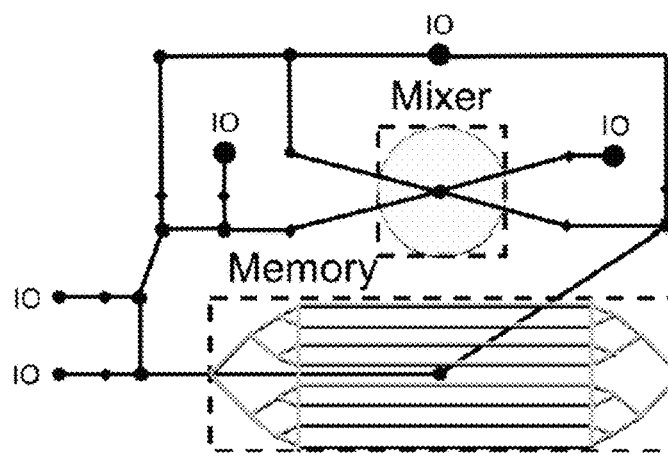
FIG. 7D is a schematic view of a portion of a microfluidic system in a third condition, in accordance with at least one embodiment of the present disclosure.
Figure 7E:
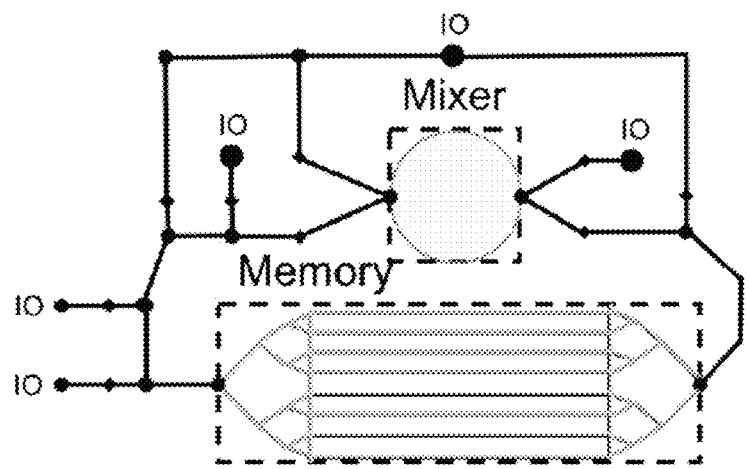
FIG. 7E is a schematic view of a portion of a microfluidic system in a fourth condition, in accordance with at least one embodiment of the present disclosure.

This section of the disclosure discusses a heuristic approach for component expansion which transforms a planar graph embedding (e.g., FIG. 7B) into a legal mVLSI layout (e.g., FIG. 7D) by judiciously shifting the location of vertices in the planar layout as each vertex is expanded into a component. This heuristic is evaluated in the context of an algorithmic design flow.

Preliminaries

An mVLSI netlist M=(C, E) is a set of components C and the fluid channels E that connect them. Typical mVSLI components include microvalves and input/output ports, as well as larger components constructed hierarchically from multiple microvalves and channels (e.g., mixers, memories, etc.). Each edge $(c_i, c_j) \in E$ represents a fluid channel that connects components $c_i$ and $c_j$. This representation treats intersection points where multiple channels converge as components (switches), enabling a graph, rather than hypergraph-based, representation.

Component $c_i \in C$ can be a tuple $c_i = (P_i; x_i; y_i; l_i; w_i)$, where Pi is the set of ports (locations on the perimeter of $c_i$ to which fluid channels can connect), $(x_i, y_i)$ is the coordinate of the upper left corner of ca after placement, and $l_i$ and $w_i$ are $c_i$'s length and width; non-rectangular components, such as circular mixers, are approximated by rectangular bounding boxes. Each port $p_{i,j} \in P_i$ is located at position $(x_{i,j}, y_{i,j})$ on the perimeter of $c_i$. The dimensions of each component and locations of each port on its perimeter can be provided in a component library.

Fluid channel $e_i \in E$ can be a tuple $e_i = (c_j, p_{j,k}, c_m; p_{m,n}, S_i)$, which indicates that $e_i$ connects adjacent components $c_j$ and $c_m$ through respective ports $p_{j,k} \in P_j$ and $p_{m,n} \in P_m$, where $S_i$ is a sequence of points representing a routing path from port $p_{j,k}$ to $p_{m,n}$.

During the layout process, the placer determines the location $(x_i, y_i)$ of each component $c_i \in C$ while the router determines the path $S_j$ for each edge $e_j \in E$; given placement information for each component, the location of the ports on its perimeter can be derived deterministically.

A graph can be viewed as a degenerate mVLSI netlist in which components are reduced to points. i.e., their areas and ports are ignored. A graph is planar if it can be embedded in the plane, i.e., if it can be drawn in such a manner that edges only cross at their endpoints. Embedding a planar graph provides the $(x_i, y_i)$ coordinates for each component $c_i$ and a routed path $S_j$ for each edge $e_j$. Every planar graph admits a straight line planar embedding which enforces the property that each routed path S degenerates to a single line segment. Planarity and straight-line planarity readily extends to mVLSI netlists. In a legal mVLSI embedding, placed components cannot overlap one another, routed fluid channels cannot intersect placed components or one another, and each routed fluid channel must connect to appropriate ports of its incident components.

PLANAR mVLSI Layout

Planar Graph Embedding.

The input is an mVLSI netlist M=(C, E), which is initially treated as a graph in its degenerate form where components are points and ports are ignored. Non-planar graphs are first planarized by introducing switches and additional control lines; because benchmarks are planar (as are real-world mVLSI LoCs), implementation can omit this step. The next step is to compute a planar embedding of the graph; in principle, any algorithm can be used. In some examples, the Chrobak-Payne planar embedding algorithm can be used, which has a publicly available implementation in the Boost Library. This places each component $c_i$ at location $(x_i, y_i)$ in a two-dimensional grid.

Component Expansion.

Components are sorted by their x-coordinates such that $c_i$ is to the left of $c_{i+1}$, and are processed from left-to-right. Each component $c_j$, $j>i$ is shifted right by $l_i$ to make room for $c_i$'s horizontal expansion. The process then repeats in the vertical direction, with components shifted vertically by $w_i$. This process updates the $(x_i, y_i)$ coordinates of each component and ensures that there is no overlap following placement.

Flow Channel Routing and Port Assignment.

Simultaneous flow channel routing and port assignment can be modeled as a min-cost network flow problem. The problem formulation ensures that routed flow channels do not overlap or inadvertently intersect. Although routability is not necessarily guaranteed, this algorithm successfully routes at least all benchmarks tested. This process computes the routing path $S_j$ for each edge $e_j$, including the choice of ports on each end of the path. While some components require specific ports to be assigned for functional reasons, many others can be connected using an arbitrary port, since they operate the same irrespective of the direction of the fluid flow. This routing method supports specific port pre-assignment by restricting the flow network to connect exclusively to a pre-assigned port; this feature may not be necessary for all benchmarks, because in some benchmarks all components allow the router to freely choose ports.

Diagonal Component Expansion (DICE)

This section introduces DIagonal Component Expansion (DICE), which can perform better than some other methods of expansion. DICE often places components on a diagonal axis from the upper left corner of the chip to the lower right corner, yielding a compact, yet routable, layout. A detailed description of the DICE heuristic is provided below after a brief overview.

Figure 8A:
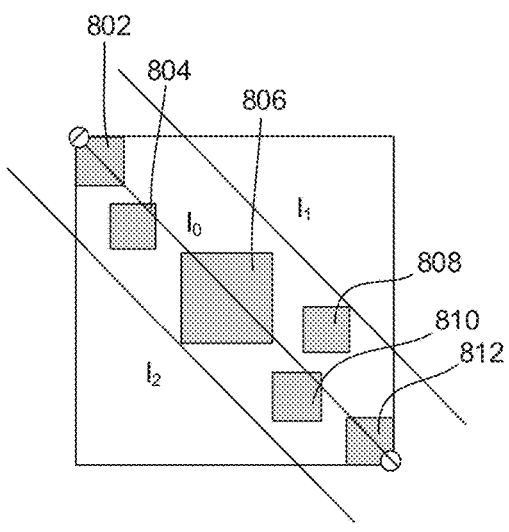
FIG. 8A is a schematic view of a portion of a microfluidic system in a first condition, in accordance with at least one embodiment of the present disclosure.
Figure 8B:
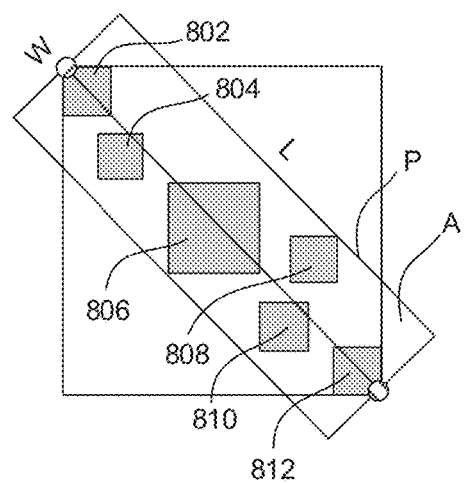
FIG. 8B is a schematic view of a portion of a microfluidic system in a second condition, in accordance with at least one embodiment of the present disclosure.

FIGS. 8A-D depict some examples of the DICE process. Given a placed mVLSI chip with components expanded diagonally, let $dl_0$ be the diagonal line segment from the top left component's upper left corner to the bottom right component's bottom right corner, as shown in FIG. 8A. The length of $dl_0$ is the length of the placed (but not yet routed) mVLSI chip along the diagonal axis. The next step is to calculate upper and lower bound lines, $dl_1$ and $dl_2$, which are parallel to $dl_0$, and of equal length, as shown in FIG. 8B. This can be done quickly by iterating through the lower-left and upper-right corners of each component. Ignoring routing, the width of the resulting chip is the perpendicular distance between $dl_1$ and $dl_2$.

Figure 8C:
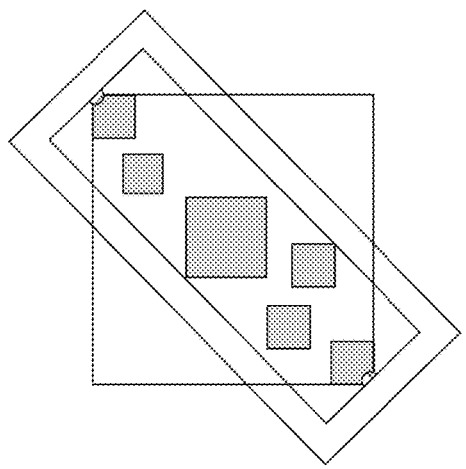
FIG. 8C is a schematic view of a portion of a microfluidic system in a third condition, in accordance with at least one embodiment of the present disclosure.
Figure 8D:
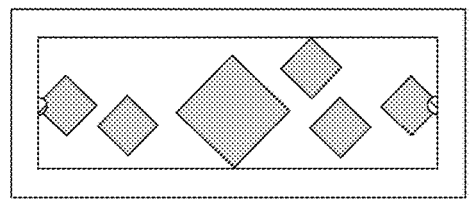
FIG. 8D is a schematic view of a portion of a microfluidic system in a fourth condition, in accordance with at least one embodiment of the present disclosure.

The last step is to route the fluid channels, trying to constrain them to the rectangular form factor along the diagonal axis. As shown in FIG. 8C, routing may increase the length and width; in the worst case, the expansion is proportional to |E|, the number of fluid channels and the spacing between them. The result remains rectangular. As shown in FIG. 8D, it is possible to rotate the chip layout to lie along the horizontal axis. This is allowable because mVLSI layout tools impose no constraints on the size, position, or rotational orientation of components. It is possible to "draw" the chip with either orientation in Solid-Works, AutoCAD, or any other modeling software.

Figure 8E:
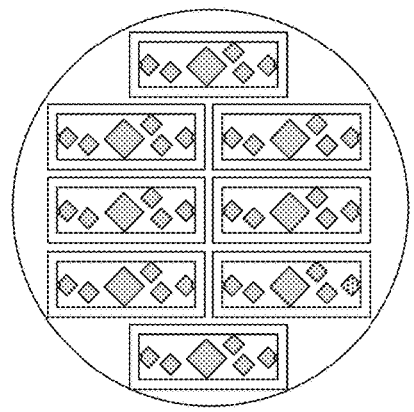
FIG. 8E is a schematic view of a portion of a microfluidic system in a fifth condition, in accordance with at least one embodiment of the present disclosure.

FIG. 8E depicts an example mold containing multiple copies of the chip layout. The example of FIG. 8 shows a mold for systems that can fabricate eight copies of the same chip. Reducing the chip area increases the number of chips per mold.

Component Selection Via Circular Propagation

Figure 9:
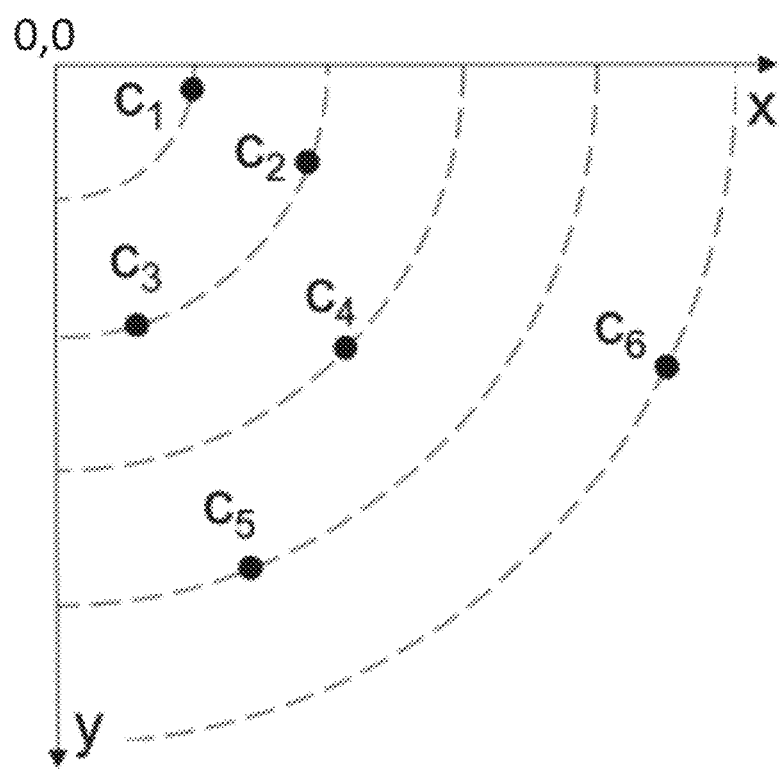
FIG. 9 is a schematic view of a portion of a microfluidic system, in accordance with at least one embodiment of the present disclosure.

DICE selects components one-by-one for expansion, expanding each point into a two-dimensional component. Components are processed in Circular Propagation order, as shown in FIG. 9. The origin, (0, 0), is the upper left corner.

Components are expanded in non-decreasing order of their distance from the origin. Equidistant components lie on a circle centered at the origin; as a tiebreaker, equidistant components are processed in increasing order of their y-coordinates.

Diagonal Expansion (pseudo code of Algorithm 4) tries to minimize the necessary increase in chip area due to component expansion.

---
Algorithm 4
---

Figure 10A:
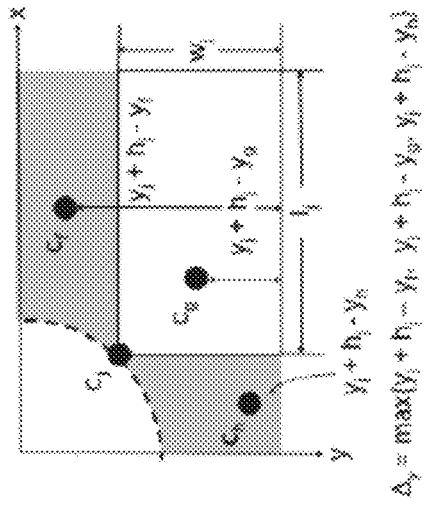
FIG. 10A is a schematic view of a portion of a microfluidic system in a first condition, in accordance with at least one embodiment of the present disclosure.
Figure 10B:
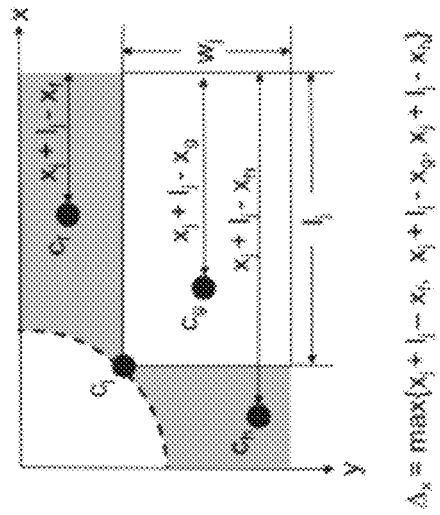
FIG. 10B is a schematic view of a portion of a microfluidic system in a second condition, in accordance with at least one embodiment of the present disclosure.
Figure 10C:
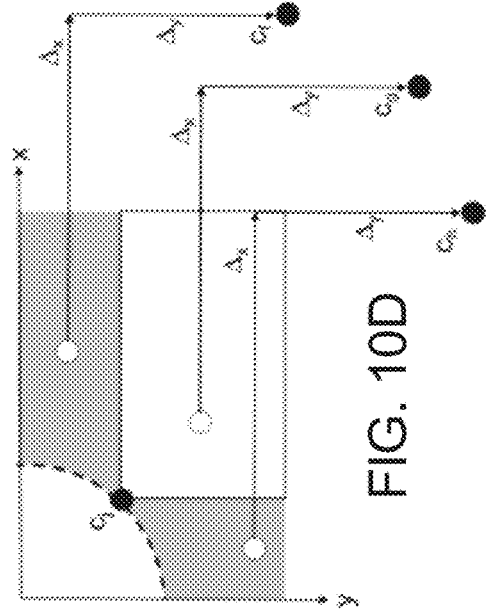
FIG. 10C is a schematic view of a portion of a microfluidic system in a third condition, in accordance with at least one embodiment of the present disclosure.
Figure 10D:
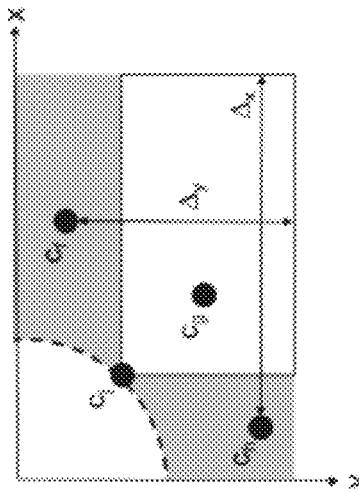
FIG. 10D is a schematic view of a portion of a microfluidic system in a fourth condition, in accordance with at least one embodiment of the present disclosure.

Input: C := set of components in the system, $\Delta_{buf}$ := minimum component spacing
Output: All ci ∈ C placed with no overlap
1:    for ci 2 C do
2:        C ← C \ {$c_j$}
3:        $\Delta_x$ ← 0, $\Delta_y$ ← 0
4:        $c_j$.expand component( )
5:        for $c_i$ ∈ C do
6:            if $c_i$.inside_left_or_above($c_j$) then
7:                $\delta_x$ ← $x_i$ + $l_i$ − $x_j$
8:                $\delta_y$ ← $y_i$ + $w_i$ − $y_j$
9:                if $\delta x$ > $\Delta x$ then
10:                   $\Delta x$ ← $\delta x$
11:               end
12:               if $\delta y$ > $\Delta y$ then
13:                   $\Delta y$ ← $\delta y$
14:               end
15:           End
16:       End
17:       for $c_i$ ∈ C do
18:           $x_i$ ← $x_i$ + $\Delta_x$ + $\Delta_{buf}$
19:           $y_i$ ← $y_i$ + $\Delta_y$ + $\Delta_{buf}$
20:       end
21:   end Let $c_j$ denote the component selected for expansion. DICE calculates a shift factor in the x- and y-directions for each component $c_i$ in the regions inside, above, or to the left of $c_j$'s expanded two-dimensional area. The shift factor in the x-direction, $\delta x = x_j + l_j − x_i$, is the distance between $c_i$'s x-coordinate and cj's right edge (FIG. 10A); the shift factor in the y-direction, $\delta y = y_j + w_j − y_i$, is the distance between $c_i$'s y-coordinate and $c_j$'s bottom edge (FIG. 10B). DICE takes the maximum calculated $\delta x$ and $\delta y$ as the shift factors in the x and y directions, $\Delta x$ and $\Delta y$ (FIG. 10C). The last step is to reposition components to remove overlap. Each remaining component in $c_k \in C$; k>j is shifted to the right by $\Delta x$ and downwards by y (FIG. 10D). If routability is a concern, a constant $\Delta$buf can be added to $\Delta x$ and $\Delta y$ to add extra buffer space to assist the fluid channel router. The new coordinate for component ci is ($x_i + \Delta x + \Delta$buf, $y_i + \Delta y + \Delta$buf). These shifts will spread the components along the device diagonal, leaving the majority of the component's ports unblocked by other components and free for use in routing.

Diagonally-Constrained Channel Routing

FIG. 11A shows a legal fluid channel routing solution following DICE; only the routes that cross the boundary of the diagonal envelope from FIG. 8B are shown. These routes are minimum length under the assumption that only horizontal and vertical directions may be used; however, they unnecessarily extend the chip area.

Diagonally-constrained routing re-routes the fluid routing channels that cross $l_1$ and $l_2$. As shown in FIG. 11B, the new routes run parallel to $l_1$ and $l_2$ while obeying spacing rules. If diagonal routes are not allowed, these routes can be approximated using a zig-zag pattern. The expansion in chip area depends on the number of re-routed channels, channel width, and foundry-imposed spacing rules between channels.

Since the mVLSI layout is planar, no edges that cross the diagonal chip boundaries overlap, and each crossing edge crosses twice. It suffices to order the crossing edges by the positions of their crossing points along the chip boundary, they can be routed optimally using the Left Edge Algorithm. From there, the resulting mVLSI chip can be cut and rotated as shown in FIGS. 8C and 8D. The high degree of routability provided by diagonal expansion, coupled with its ability to re-route channels along the diagonal axis, reduces the space needed to fully place and route a chip. This can improve area utilization and can decrease reduce flow channel route length. However, it is possible for a placement to be generated that cannot yield a valid channel routing; either while routing the flow layer, or when routing the control layer. When either the flow or control layer fails to route then the current partial route is removed, the constraints used to generate the original placement are relaxed, and the netlist is re-placed. This process can then repeat as necessary until the flow and control layers are validly routed.

Baseline Heuristics

This section introduces two alternative methods for component expansion which can be used as baselines for comparison with DICE in the following section. When expanding a component, each of these methods attempt to identify a single expansion factor that can be applied to all not-yet-expanded points in the netlist.

Shift Expansion

Let $c_i$ be the component currently being expanded, and assume that C contains only those components that have not yet be expanded. The basic premise is to shift the position of component $c_j \in C$ by an amount that is proportional to the distance between $c_j$ and $c_i$ in the x- and y-directions, which moves the component $c_j$ out of the expansion area of $c_i$. To do this, shift expansion computes shift factors $d_x$ and $d_y$, which are applied to each component $c_j$, shifting it to position ($x_j + |x_j − x_i| \times d_x$, $y_j + |y_j − y_i| \times d_y$); the shift may include an additional term, $\Delta_{buf}$, to add additional spacing if routability is a concern.

Figure 12B:
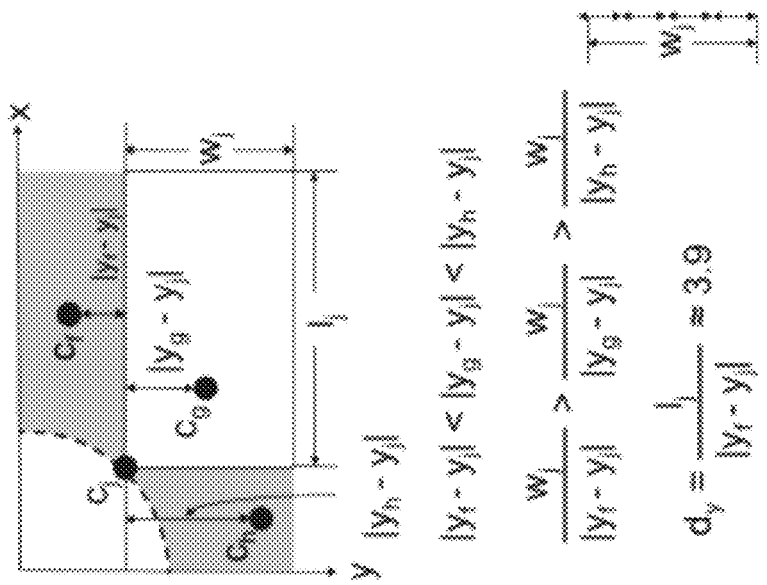
FIG. 12B is a schematic view of a portion of a microfluidic system in a second condition, in accordance with at least one embodiment of the present disclosure.
Figure 12A:
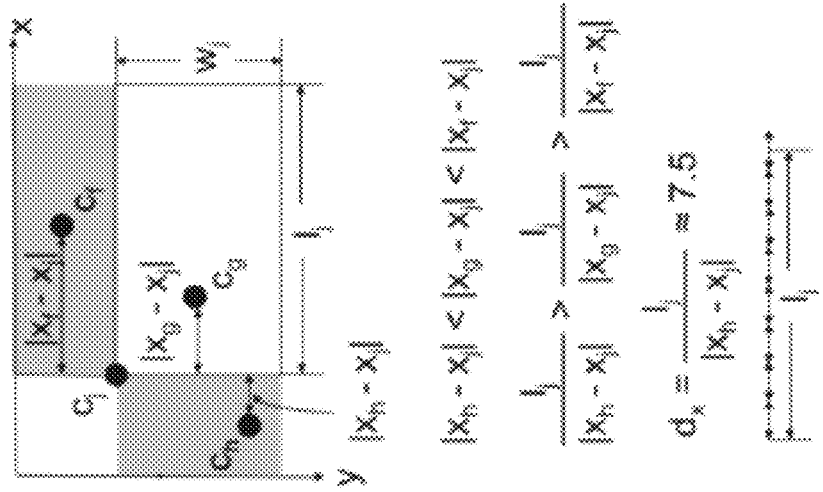
FIG. 12A is a schematic view of a portion of a microfluidic system in a first condition, in accordance with at least one embodiment of the present disclosure.
Figure 12C:
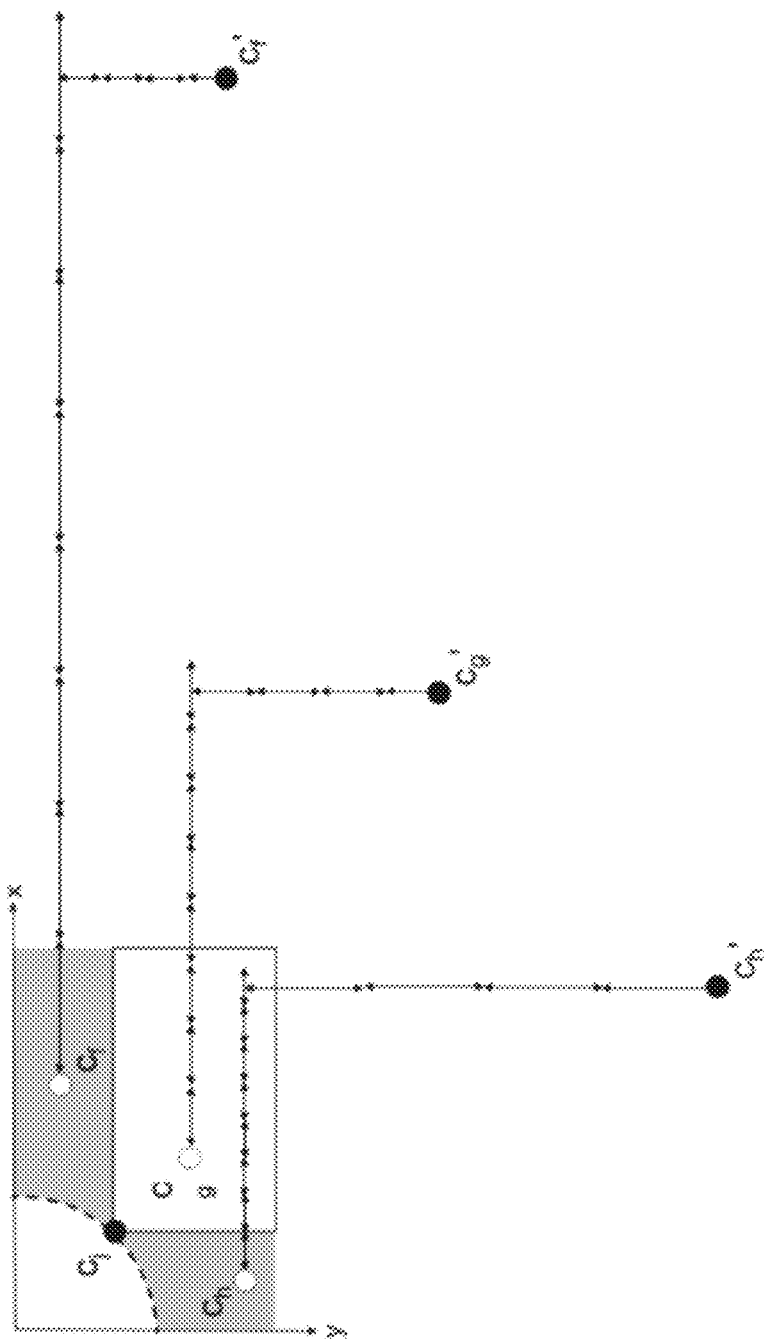
FIG. 12C is a schematic view of a portion of a microfluidic system in a third condition, in accordance with at least one embodiment of the present disclosure.

The position of component $c_i$ is represented by coordinate ($x_i$, $y_i$) at its upper left corner; the length and width of $c_i$ after expansion are $l_i$ and $w_i$ respectively. To compute $d_x$ and $d_y$ (FIGS. 12A and 12B respectively) the algorithm selects three not-yet-expanded components, $c_f$, $c_g$, and $c_h$, which are the points lying closest to ci in the respective regions above, inside, and to the left of $c_i$'s expanded component. The algorithm scales length $l_i$ and width $w_i$ by the differences in the x- and y-coordinates between ci and the three selected points, yielding terms $d_{x,f}$, $d_{x,g}$, and $d_{x,h}$ in the x-direction, and $d_{y,f}$, $d_{y,g}$, and $d_{y,h}$ in the y-direction; $d_x$ and $d_y$ are then selected as the respective maximum values between the two sets of three terms and the components are sifted by the same factor x- and y-directions (FIG. 12C).

Scaled Expansion

The Scaled Expansion expands upon Shifted Expansion and tries to find the smallest global scale factor that can remove component overlap from the initial placement. The algorithm checks each possible integer scale factor in the x- and y-dimensions until a valid placement (including any buffer spacing) is found. Scaled expansion begins with integer scale factors of 2 in the x- and y-dimensions. For component ci∈C, the algorithm multiplies $x_i$ by the x-dimension scaling factor, $scale_x$ and $y_i$ by the y-dimension scaling factor, $scale_y$. The algorithm then determines if any two components overlap. If so, the algorithm reverts each component $c_i$ back to its initial location, $(x_i, y_i)$. If a valid placement is not found in either the x- or y-dimension, the algorithm increments the scaling factor(s) and repeats the process until no overlap occurs.

MVLSI Placement Metrics

Although mVLSI technology and its underlying physical design processes share many principle similarities with semiconductor VLSI, there are also important differences which cannot and should not be ignored. Prior work has mistakenly evaluated the quality of mVLSI layouts using semiconductor metrics such as area and wire length (fluid channel length) as proxies for good quality layouts. Although the metrics in the next section are reported for the purpose of enabling direct comparison with prior work, they are reported with reservations. Without considering the larger context, these metrics are fundamentally flawed, as they do not account for the factors that influence performance (bioassay execution time) or the differences between semiconductor and mVLSI fabrication processes, economies of scale, etc. In short, they are not nearly as important as prior papers that have emphasized optimization and (near-) optimality claim them to be.

Area

In semiconductor VLSI, chip area correlates directly to cost (number of chips per wafer) and indirectly to performance (reducing area may, in some cases, reduce the lengths of the longest wires routed on-chip). One cannot understand the relationship between mVLSI area and cost without first understanding the fabrication process. The key takeaways from the discussion which follows is that only dramatic reductions in mVLSI chip area will increase the number of chips per wafer, and, as discussed below, mVLSI chip area has practically no impact on performance.

Each layer of an mVLSI chip is fabricated separately, and layers are only bonded together late in the fabrication process. The key objective of mVLSI fabrication is to imprint a pattern (flow and control channels) in each layer. This can be done by creating a mold through a lithographic process, which sits atop a standard silicon wafer, typically 150 mm or 200 mm in diameter. In other examples, this process can use a glass wafer, or another type of suitable substrate. Liquid polydimethylsiloxane (PDMS) is poured on top of the mold, after which it is spun (for consistency), degassed (to remove air bubbles), and baked (to solidify). The solidified PDMS is then removed from the mold, and the corresponding layer of each chip can be cut out, e.g., with a sharp and precise cutting instrument (or an automatic cutter). For a multi-layer chip, the flow and control layers must then be aligned under a microscope and placed on a glass slide; then they are baked for bonding. Once the bonded chip is cooled, it is aligned, once again under a microscope, to punch I/O holes. In some examples, the I/O holes can be punched before alignment and bonding, this can allow for punching entirely through the layer. Prior to use, the chip must be tested to ensure that it is defect-free.

This fabrication process lacks the economies of scale that are present in semiconductor manufacturing. In an academic setting, the most labor-intensive steps are alignment, hole punching, and testing, which are often performed by PhD students or postdocs. If a fixed number of chips (say 100) need to be fabricated and tested to produce statistically robust results for a publishable paper, then the cost driver is not the number of chips per wafer but the manual labor involved. Thus, area minimization (within reason) is far less important than producing a functionally correct layout. These issues have also hampered industrial adoption of mVLSI technology; industrial preference is strongly biased toward passive devices (no valving) using fabrication processes such as injection molding or glass etching. The purpose of this statement is not to disparage academic efforts on mVLSI design automation; it is simply to place the work in its appropriate context. The number of mVLSI chips per mold depends on wafer size (mold size) and chip size. For large and complex mVLSI chips, the number of chips per mold may be relatively small (e.g., 10 or less); these are, of course, the most challenging chips to lay out algorithmically. For a given chip design, a significant reduction in area through more effective physical design could, in principle, free up enough space to add another chip to the mold; on the other hand, incremental reductions in area that do not increase the number of chips per mold will simply reallocate area from the device to the extra PDMS that is cut away and discarded. As placement algorithms become increasingly effective, incremental improvements in the 1-2% range (which would certainly be valuable in semiconductor VLSI) are likely to have minimal impact, outside of rare corner cases. Thus, it is fair to question the utility and practicality of long-running and optimal and near-optimal algorithms such as those based on Integer Linear Programming or SAT solving.

Routing Channel Length

In semiconductor VLSI, channel length can directly affect clock frequency, power dissipation and signal integrity; these are non-issues in mVLSI. mVLSI chips are not aggressively clocked; they do not consume power directly, as fluid is driven by external pressure sources, which are typically plentiful in biological laboratories; and fluid transport integrity issues are minimized due to pumping (this issue is much more challenging and prevalent for passive device designs, which is beyond the scope of this paper).

Reducing fluid channel length can reduce fluid transport times; however, in microfluidics, bioassay execution time is typically dominated by biological phenomena (e.g., culturing cells), and in any given scenario, the biological phenomena may or may not be dominant when considering the entire end-to-end workflow of the laboratory. Thus, the performance motive to shave a few seconds from a process that may take hours or days is questionable at best. Any claim that reducing fluid channel length is integral to mVLSI chip performance is spurious.

There is, however, one benefit that can be accrued by reducing fluid channel lengths. The key issue is that fluid is transferred in continuous flows, not discrete packets. Thus, reducing fluid channel lengths can reduce the total volume of fluid required to perform a bioassay. This can lead to tangible cost savings when dealing with limited sample volumes and expensive reagents.

Fluid Channel Intersections

Figure 13C:
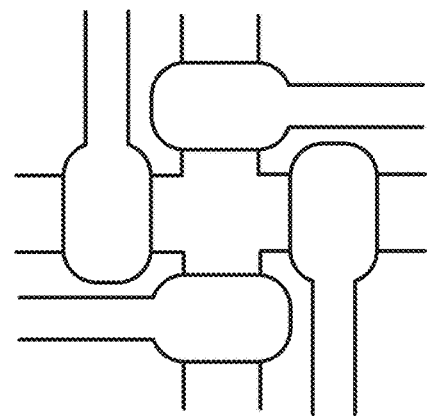
FIG. 13C is a schematic view of a portion of a microfluidic system in a third condition, in accordance with at least one embodiment of the present disclosure.
Figure 13B:
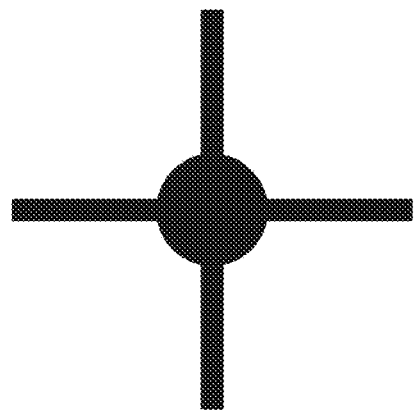
FIG. 13B is a schematic view of a portion of a microfluidic system in a second condition, in accordance with at least one embodiment of the present disclosure.
Figure 13A:
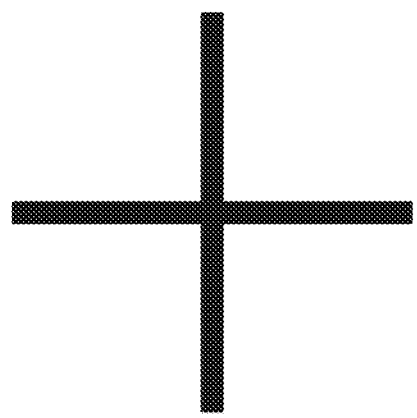
FIG. 13A is a schematic view of a portion of a microfluidic system in a first condition, in accordance with at least one embodiment of the present disclosure.

Microfluidic chips are typically I/O limited, including both fluid and control. For example, the Stanford Microfluidic Foundry limits the number of I/Os to 35 as a design rule, in one example. In other examples, the number can be limited to 10, 20, 30, 40, 50, 100, and the like. This has implications for layout constraints on mVLSI chips. mVLSI chips are planar by definition. A non-planar layout can be planarized by inserting a switch at each point where two channels cross one another (FIGS. 13A-C); each switch requires four valves with two independent controls; a set of switches may share controls if they do not operationally interfere with one another. The insertion of switches may negatively impact performance, as fluid flowing through switches must be serialized, and the switches must be decontaminated by rinsing after each fluid transfer. Thus, it is generally preferable to minimize the number of switches that must be inserted during layout, even within the scope of foundry-imposed design rules.

The experimental evaluation considers planar netlists exclusively. It may be that any layout method that inserts switches should be considered inferior to one that does not, before considering any other optimization criteria other than functional correctness.

Experimental Results

DICE was implemented in C++ using the algorithmic framework summarized above with respect to planar mVLSI layout. The framework employs a unitless grid, which decouples the layout and design rule checking processes from the manufacturing resolution of any one specific mVLSI technology. From the layout, the number of switches inserted (if applicable) can be easily counted, the area (and/or area utilization) can be measured and (gridless/normalized) fluid channel length can be determined, and the resulting layout can be converted to a technology-specific grid. From there, one or more instances of an mVLSI chip can be laid out (or a heterogeneous set of chips) on a silicon wafer/mold of a known size.

Experimental Comparison

Six different mVLSI layout algorithms are compared, including two variants of DICE. Simulated Annealing (SA) refers to the simulated annealing algorithm discussed above, which uses Hadlock's Algorithm for channel routing. SA cannot guarantee a planar layout for planar netlists; all other methods included here provide this guarantee. Baseline Expansion (BaseEx) refers to the component expansion method discussed above. Shift Expansion (ShiftEx) replaces BaseEx's component expansion step with Shift Expansion, discussed above. Scaled Expansion (ScaleEx) replaces BaseEx's component expansion step with Scaled Expansion. DICE-Unconstrained (DICE-U) replaces BaseEx's component expansion step with DICE, implemented with unconstrained fluid channel routing (FIG. 11A). DICE is implemented with diagonally-constrained fluid channel (FIG. 11B).

Benchmarks

Netlists for four real-world planar mVLSI chips were obtained that have been designed, fabricated, and evaluated, as well as five netlists obtained by synthesizing synthetic benchmarks. Examples of real-world netlists follows. Aqua-Flex-3b & AquaFlex-5a: proprietary mVLSI LoC netlists provided by Microfluidic Innovations, LLC. HIV1: a multi-layer PDMS chip that performs a bead-based HIV1 p24 sandwich immunoassay. MGG: a molecular gradients generator that can generate five concentration levels of a two-sample mixture. The five synthetic benchmarks were generated by compiling a set of publicly available DAG specifications through an established mVLSI architectural synthesis flow. Experiments were run using a buffer of 5 grid spaces for each component. Legal planar mVLSI embeddings were obtained for all component expansion algorithms.

Results and Analysis

For each component expansion heuristic and benchmark, the number of channel intersections are shown (Table 1) and the area utilization (FIG. 14A: the ratio of component area to total chip area expressed as a percentage) and the average routing channel length (FIG. 14C) are shown. Computation time of the framework is dominated by the routing and port assignment phase; varying the component expansion heuristic made a negligible impact.

TABLE 1

| Algorithm | # Comp. | # Conn. | SA | BaseEx | ShiftEx | ScaleEx | Dice-U | DICE |
|---|---|---|---|---|---|---|---|---|
| AquaFlex-3b | 14 | 13 | 25 | 0 | 0 | 0 | 0 | 0 |
| AquaFlex-5a | 17 | 16 | 36 | 0 | 0 | 0 | 0 | 0 |
| HIV1 | 13 | 12 | 21 | 0 | 0 | 0 | 0 | 0 |
| MGG | 30 | 38 | 167 | 0 | 0 | 0 | 0 | 0 |
| Synthetic 1 | 21 | 21 | 52 | 0 | 0 | 0 | 0 | 0 |
| Synthetic 2 | 12 | 11 | 13 | 0 | 0 | 0 | 0 | 0 |
| Synthetic 3 | 34 | 33 | 142 | 0 | 0 | 0 | 0 | 0 |
| Synthetic 4 | 34 | 33 | 136 | 0 | 0 | 0 | 0 | 0 |
| Synthetic 5 | 45 | 45 | 207 | 0 | 0 | 0 | 0 | 0 |

Channel Intersections

As discussed above, channel intersections necessitate the introduction switches, which in turn, require additional control lines; these, in turn, increase chip area, and may lead to a design rule violation of the number of switches in the netlist exceeds found-specific limits.

Table 1 reports the number of fluid routing channel intersections for each of the layout heuristics that were evaluated. The heuristics based on planar placement with component expansion, as expected, did not introduce any new intersections, given that the input netlists were planar; SA, in contrast, introduced numerous unnecessary channel intersections to all netlists. Consequently, few, if any, of the netlists produced by SA could be fabricated at Stanford, which limits the number of I/O hole punches to 35; the total number of punches would be the sum of the netlist's initial fluidic I/O and control requirement, plus two additional control lines per intersection. These results demonstrate the need to properly account for planar embedding during layout.

Area Utilization

Figure 14A:
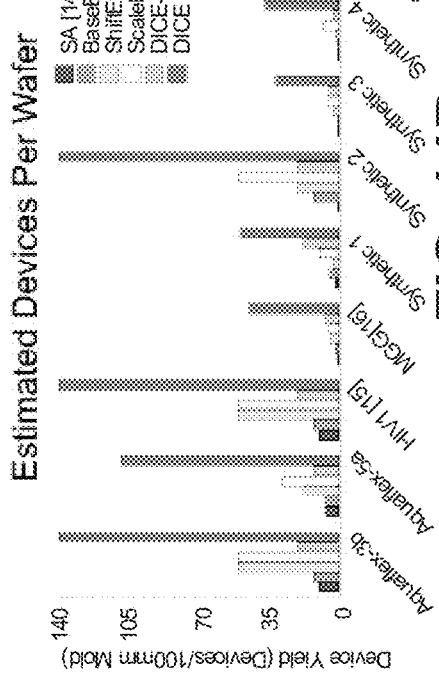
FIG. 14A is a chart showing results of analysis on methods of creating microfluidic system designs, in accordance with at least one embodiment of the present disclosure.

FIG. 14A reports the area utilization (i.e., the percentage of total chip area dedicated to components and channels). DICE achieved the highest area utilization for each benchmark, and the gap between DICE's result and the best result of the remaining heuristics was significant in all cases. On average, DICE improves area utilization by a factor of 8.90 times compared to BaseEx and 2.64 times compared to ScaleEx. SA does not perform particular well in this comparison, except for the Synthetic-5 benchmark, where it achieves the second highest area utilization; however, this result is built on top of 207 channel intersections (necessitating 414 control lines), which cannot be fabricated.

FIGS. 11A and 11B illustrates the reason that DICE improves area utilization compared to DICE-U. DICE-U performs routing on a square chip with a relatively long and densely packed (in terms of components) diagonal; it finds minimum-Manhattan distance fluid channel routes, which mostly follow simple X-Y and Y-X routing patterns with one bend. In contrast, DICE's diagonally constrained routing tends to reduce overall chip area. ScaleEx, in contrast, tends to generate chips with shorter diagonals than DICE-U, leading to smaller rectangular area and higher area utilization; however, this inhibits the effectiveness of diagonally-constrained routing. These observations explain why DICE achieves the highest area utilization reported in FIGS. 11A-B.

Devices Per Wafer

Figure 14B:
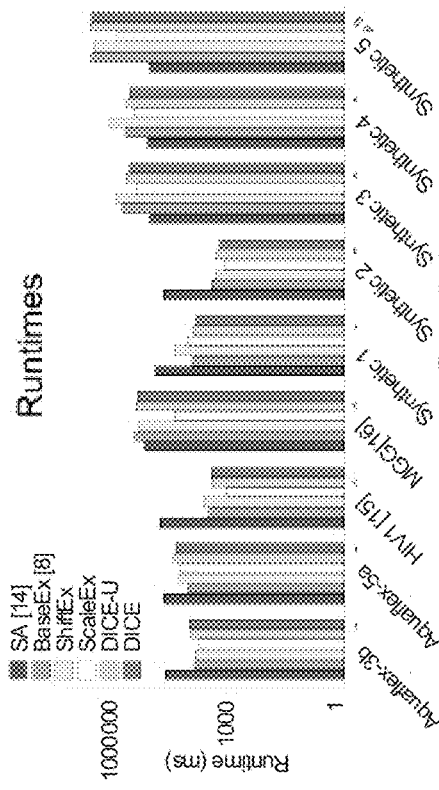
FIG. 14B is a chart showing results of analysis on methods of creating microfluidic system designs, in accordance with at least one embodiment of the present disclosure.

FIG. 14B reports the number of mVLSI flow layer devices that can be fabricated on a mold cast on a 100 mm-diameter silicon wafer using the different layout algorithms. DICE achieves the highest number of devices per wafer for all benchmarks, with a significant gap between the second-best performer in each case. These results correlate more or less directly with the area utilization results shown in FIG. 14A.

Average Fluid Routing Channel Length

Figure 14C:
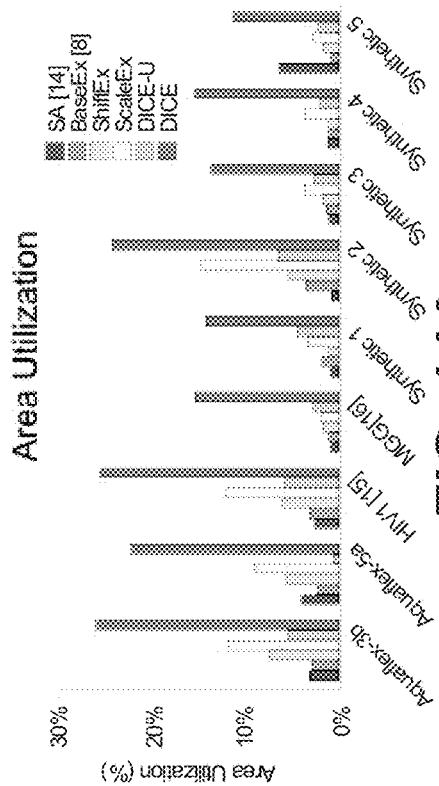
FIG. 14C is a chart showing results of analysis on methods of creating microfluidic system designs, in accordance with at least one embodiment of the present disclosure.

For all benchmarks in FIG. 14C, either ScaleEx or DICE achieve the shortest average fluid routing channel length, and in most cases, the disparity between the two is quite small. These results indicate that the initial planar embedding solution is quite effective in terms of limiting the fluid channel length, and ScaleEx retains those benefits by maintaining the same relative position of components. DICE, in contrast, repositions components in a manner that primarily improves chip area while retaining the channel length benefits of the planar embedding. On average, DICE improves average fluid routing channel length by 47.4% compared to BaseEx and 9.62% compared to ScaleEx.

Runtime

Figure 14D:
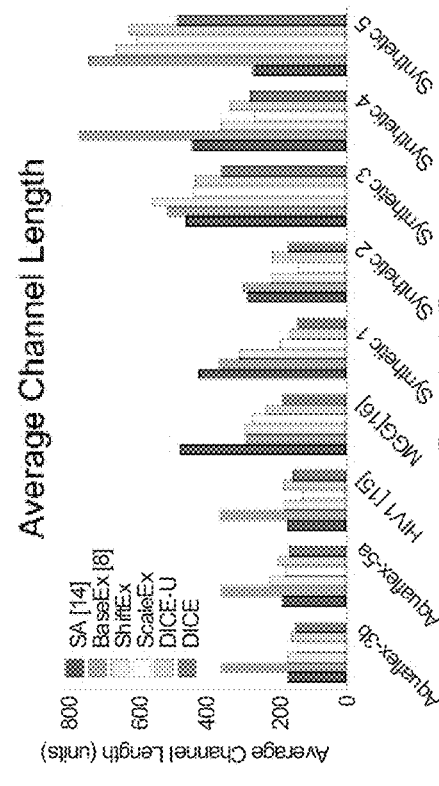
FIG. 14D is a chart showing results of analysis on methods of creating microfluidic system designs, in accordance with at least one embodiment of the present disclosure.
Figure 15A:
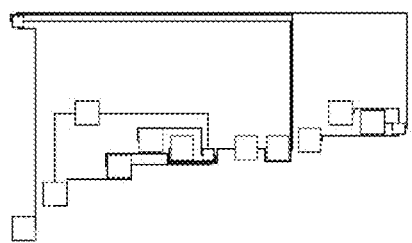
FIG. 15A is a schematic view of a portion of a microfluidic system in a first condition, in accordance with at least one embodiment of the present disclosure.
Figure 15B:
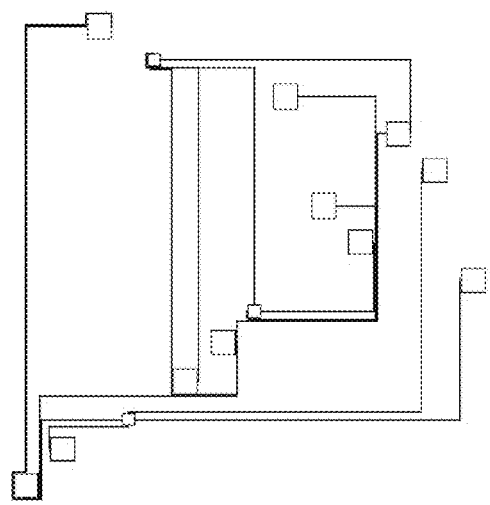
FIG. 15B is a schematic view of a portion of a microfluidic system in a second condition, in accordance with at least one embodiment of the present disclosure.
Figure 15C:
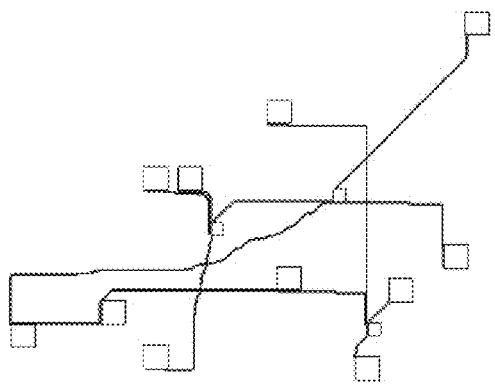
FIG. 15C is a schematic view of a portion of a microfluidic system in a third condition, in accordance with at least one embodiment of the present disclosure.
Figure 15D:
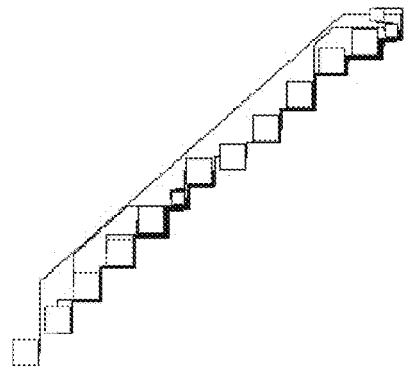
FIG. 15D is a schematic view of a portion of a microfluidic system in a fourth condition, in accordance with at least one embodiment of the present disclosure.
Figure 15E:
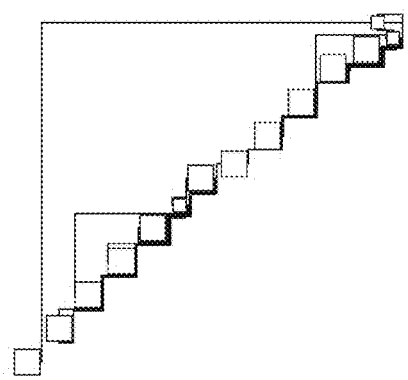
FIG. 15E is a schematic view of a portion of a microfluidic system in a fifth condition, in accordance with at least one embodiment of the present disclosure.
Figure 15F:
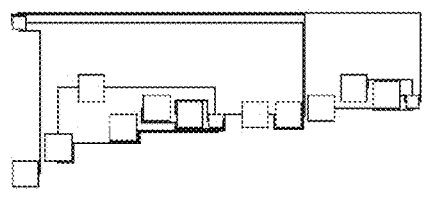
FIG. 15F is a schematic view of a portion of a microfluidic system in a sixth condition, in accordance with at least one embodiment of the present disclosure.

FIG. 14D reports the runtimes of the planar layout algorithms. The runtime of SA, it should be noted, depends on parameter configurations, and is thus variable. The use of SA herein had SA running approximately as fast as the planar embedding methods that were evaluated herein. It is also worth noting that SA uses a router based on Hadlock's Algorithm, as opposed to the network flow-based router used by the planar embedding heuristics. Better results, in principle, could be obtained by letting SA run longer; that said, it seems unlikely that SA would achieve planar layouts within a reasonable runtime.

The remaining placers typically complete in milliseconds; the router dominates the total runtime. For a given benchmark, variations in runtime among the different layout heuristics is determined primarily on how quickly the router can obtain a valid solution.

Case-Study: AquaFlex-3B

As a case study, FIGS. 15A-15F shows the flow layers of the AquaFlex-3b benchmark using all six placement and routing heuristics. SA (FIG. 15A) yields a non-planar layout with poor area utilization; in principle, adjusting the parameters to provide a longer runtime could yield better results, however, it is unlikely to guarantee a planar layout that could be fabricated.

BaseEx (FIG. 15B) achieves a planar layout, which can be fabricated, but with poor area utilization. Each time BaseEx expands a new component, it shifts the positions of all components that have not yet been expanded by the expansion amount in the horizontal and vertical directions. For example, consider two points on a common vertical axis that would not overlap if expanded. When the first point is expanded, the second will be shifted in both directions, arguably unnecessarily. This ensures that any horizontal or vertical line cutting through the design will intersect at most one component. Although BaseEx preserves planarity, it does so at the expense of area utilization.

ShiftEx (FIG. 15C) and ScaleEx (FIG. 15D) generate similar layouts, with the latter achieving slightly better area utilization. The key to the improvement is to scale the length of the horizontal and vertical shifts by the distance of the component being expanded to its nearest neighbors, which yields shorter shift distances than BaseEx. ShiftEx retains a slight advantage over ScaleEx because it computes a shift distance independently for each not-yet-expanded component, while ScaleEx computes one scale factor that is applied to shift all not-yet-expanded components.

DICE-U (FIG. 15E) achieves a tighter layout by shifting components in a manner that tends to lay them out along a diagonal axis. Although components are clustered along the diagonal, the length of the diagonal and total chip area is larger than the results produced by ShiftEx and ScaleEx, and may result in long fluid routing channels whose length is equal to the Manhattan Distance between their incidental components. DICE (FIG. 15F), which allows for diagonal routing parallel the diagonal axis, eliminates these inefficiencies, once the chip is cut out and rotated.

Planar mVLSI Netlist Embedding

The heuristics and experiments disclosed were conducted using an algorithm framework. This framework consistently produces planar mVLSI embeddings without inserting additional switches, and experiments apparently confirm this observation. The component expansion heuristics disclosed herein improve area utilization, average fluid channel length, and the number of devices per wafer.

Non-Planar mVLSI Netlist Embedding

Non-planar netlists can be planarized by placing multi-valve switches at intersection points between two crossing flow channels, however, this requires extra control lines, whose number is limited by modern design rules, such as those imposed by the Stanford Microfluidics Foundry. This limits the ability of physical design tools to synthesize non-planar netlists of arbitrary complexity. Non-planar mVLSI netlist synthesis may consider multiple objectives including minimizing the number of flow channel crossing, minimizing area, and minimizing flow channel length. Researchers have proposed placers using simulated annealing and iterated cluster expansion (ICE). Non-planar routing algorithms may reduce fluid routing channel length, but do not limit the number of channel crossings. These approaches are unlikely to yield workable mVLSI chips that can be fabricated, and should not be used to lay out planar mVLSI netlists. The problem of simultaneous mVLSI planarization and layout with minimal switch insertion is identical to the problem of graph embedding while minimizing the number of edge crossings; the reduction inserts switches at each cross-point, as opposed to allowing a non-planar embedding. The decision problem of determining whether a graph can be embedded with at most K edge crossings is NP-complete. The graph drawing community has studied this problem in great detail; should non-planar mVLSI netlists become prevalent (e.g., due to widespread adoption of mVLSI architecture synthesis tools, none of which guarantee planar netlists), then these algorithms represent a good starting point for future work on non-planar mVLSI layout.

Figure 16:
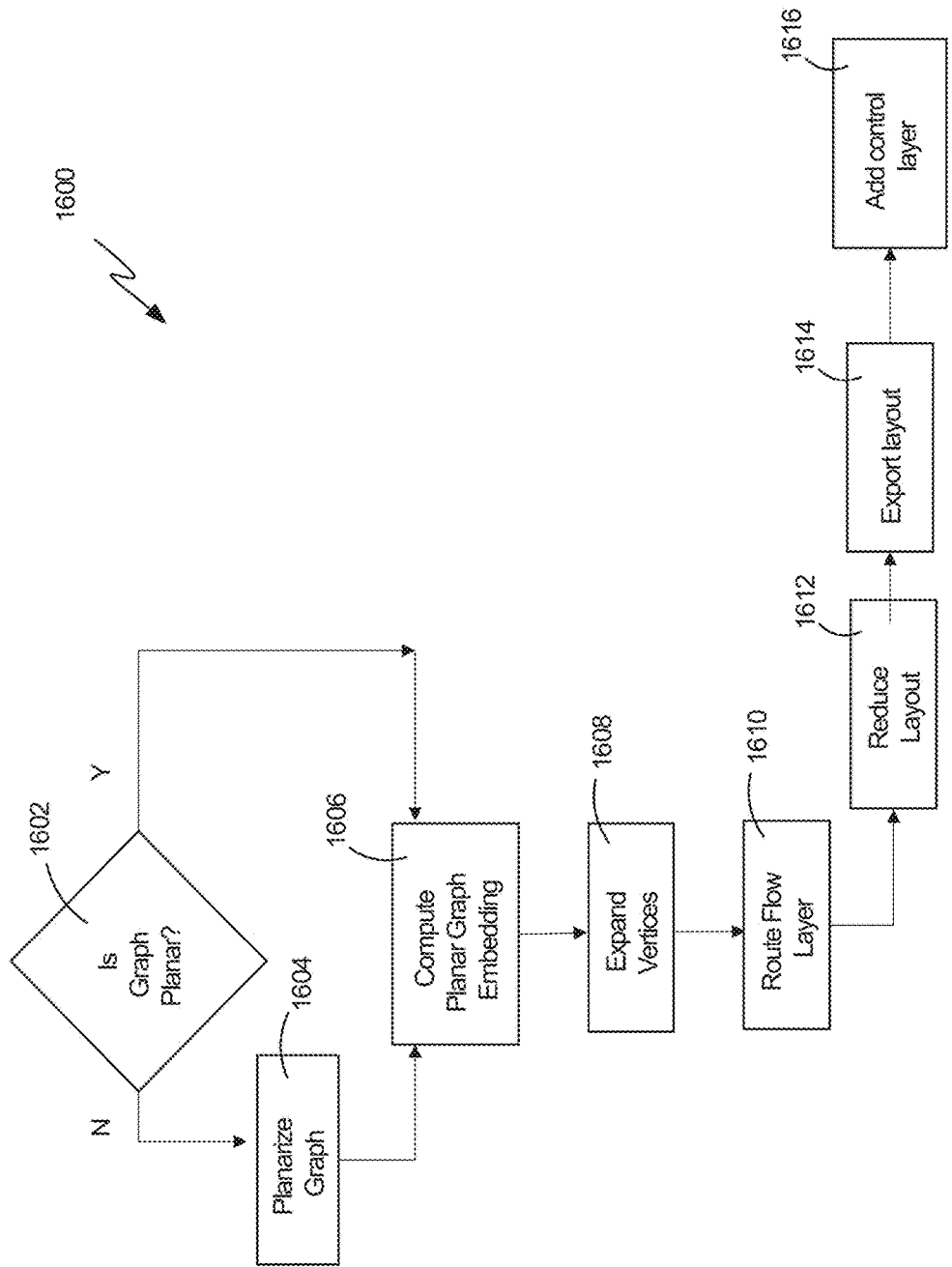
FIG. 16 is a flow chart of a method, in accordance with at least one embodiment of the present disclosure.

FIG. 16 is a flow chart of method 1600, in accordance with at least one embodiment of the present disclosure. The steps or operations of the method of FIG. 16 are illustrated in a particular order for convenience and clarity; many of the discussed operations can be performed in a different sequence or in parallel, and some operations may be excluded, without materially impacting other operations. The method of FIG. 16, as discussed, includes operations performed by multiple different actors, devices, and/or systems. It is understood that subsets of the operations discussed in the method of FIG. 16 attributable to a single actor, device, or system could be considered a separate standalone process or method.

Method 1600 can begin at step 1602 where it can be determined whether a graph is planar, for example using the Boyer-Myrvold method. At step 1604 the graph can be planarized if it is determined in step 1602 that it has not been planarized. In step 1604, the graph can be made planar using any available planarization method. In step 1606, a planar graph embedding can be computed, such as by using Algorithm 1, discussed above. The planarized graph can include a netlist including vertices representing microfluidic components.

At step 1608, the vertices can be expanded into two dimensional components, as shown with respect to FIGS. 3A-3E (in one example), where each component including a first dimension and a second dimension. Step 1608 can also include shifting the components to a position where the first and second dimension of each component do not overlap with the first dimension and the second dimension of any other component as shown with respect to FIGS. 3A-3E (in one example). At 1610, a flow route can be determined based on the first and second dimension of each component and the position of each component, where the flow route including channels connecting two or more of the components, as shown, for example, in FIGS. 4-5 and 10.

At step 1612, the layout can be reduced, as shown in FIGS. 5A and 5B, for example. At step 1614, the physical design layout including positions of the components and channel routes connecting the components can be exported, for example for manufacturing of a microfluidic system chip. At step 1616, a control layer can be added to the layout.

In another example, determining the flow route is based on a set of grid points, the position of each component, the first and second dimensions of each component, and the location of each channel.

Figure 17:
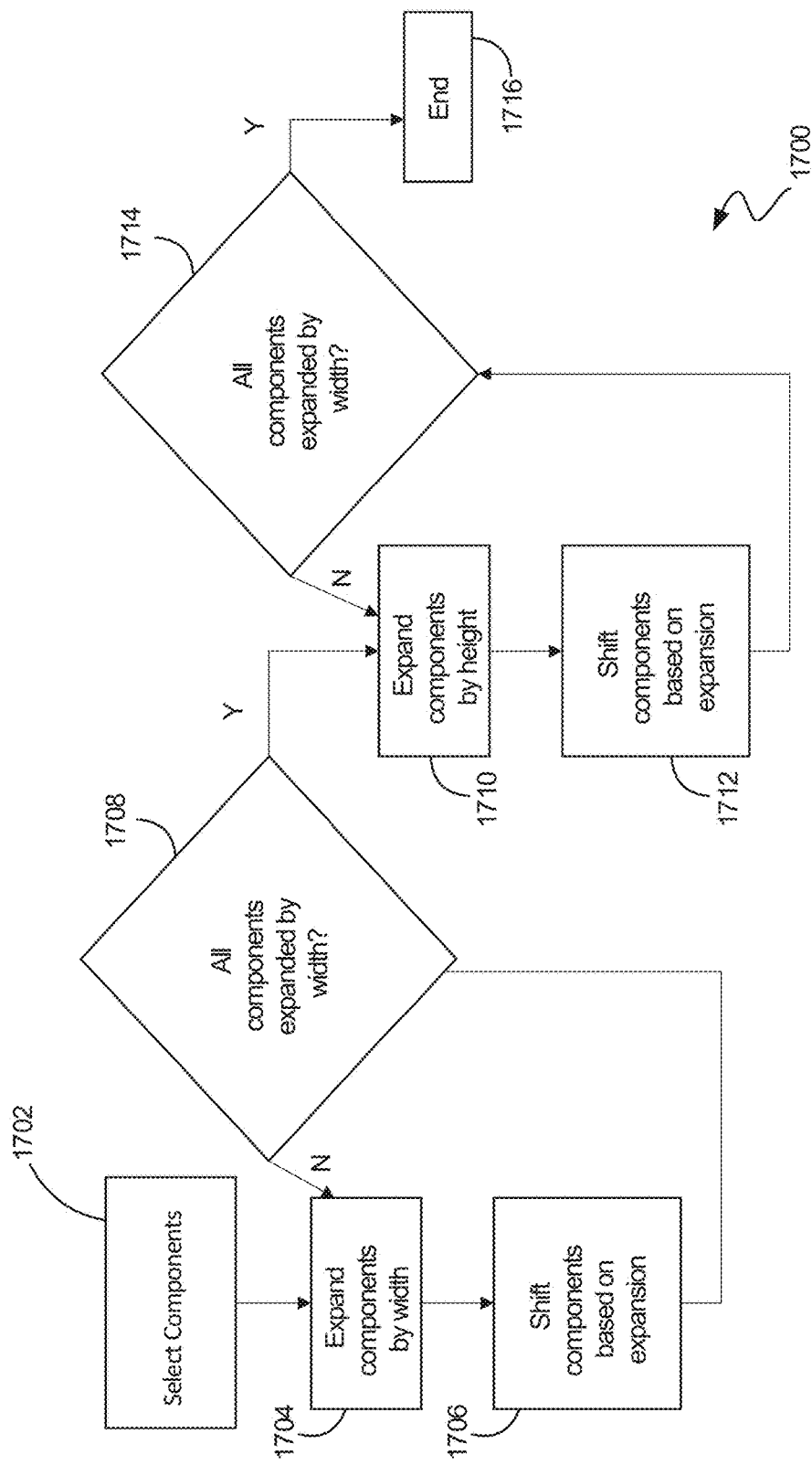
FIG. 17 is a flow chart of a method, in accordance with at least one embodiment of the present disclosure.

FIG. 17 is a flow chart of method 1700, in accordance with at least one embodiment of the present disclosure. At step 1702 the components can be selected. In some examples, the components can be sorted or ordered, for example, by their x or y coordinate. In another example, the components can be ordered using circular propagation as described with respect to FIG. 9 above. In yet another example, components can be ordered canonically.

At step 1704, the components can be expanded by their width. For example, component 314 can be expanded by its width 314X, as shown in FIG. 3B. At step 1706 all of the components can be shifted based on the expansion of the components, such as component 314. The shift can be the width of component 314 plus another factor, as discussed above with respect to FIG. 3. At step 1708 it can be determined whether expansion and shift based on width has been performed for all components. If not, steps 1704-1706 (and in some cases 1702) can be repeated until all components have been sorted, expanded, and shifted. Once this has occurred, the components can be expanded and shifted based on height in steps 1710 and 1712, respectfully. At step 1714 it can be determined whether expansion and shift based on height (Y component or dimension) has been performed for all components. If not, steps 1710 and 1712 can be repeated until all components have been expanded and shifted. Once complete, the process can end at step 1716.

Figure 18:
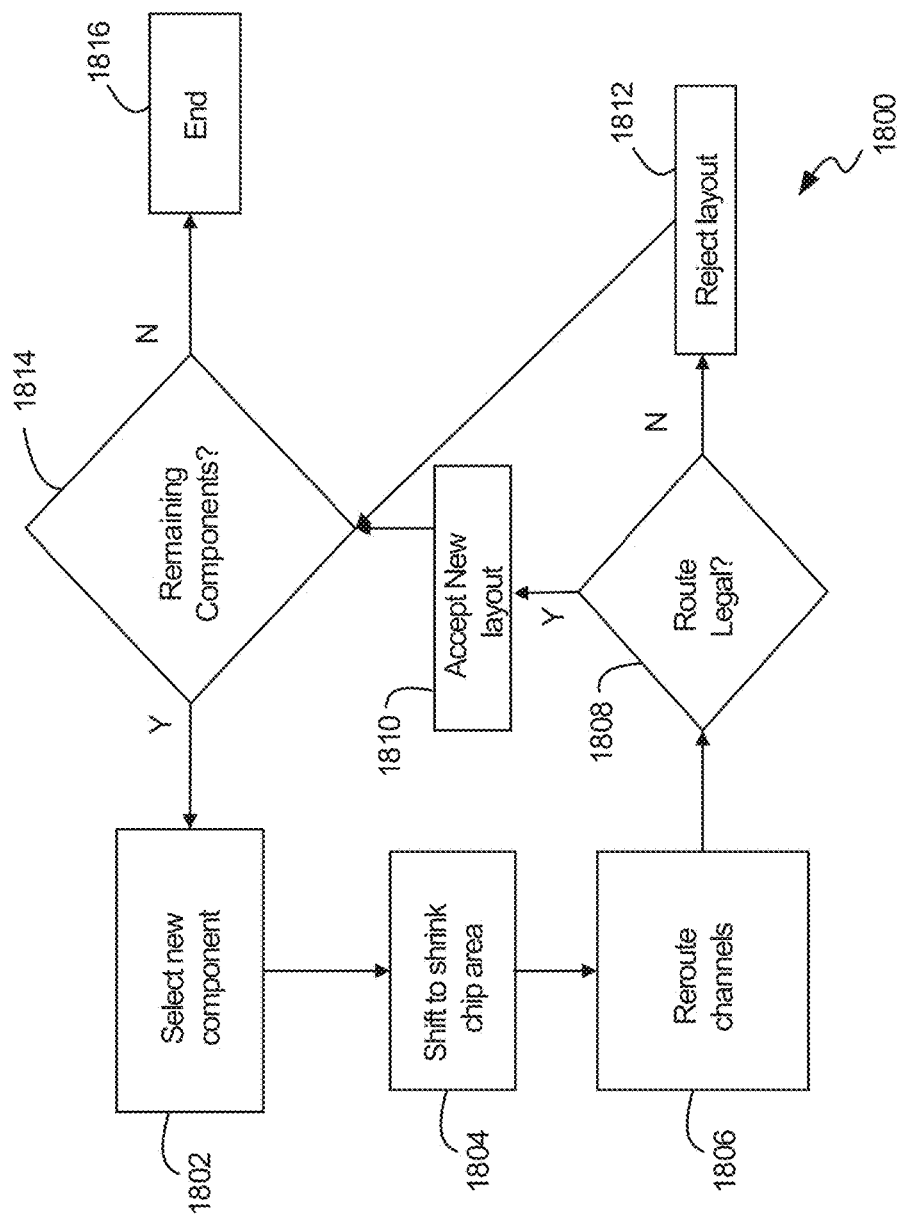
FIG. 18 is a flow chart of a method, in accordance with at least one embodiment of the present disclosure.

FIG. 18 is a flow chart of method 1800, in accordance with at least one embodiment of the present disclosure. Method 1800 generally discusses post-processing, however, these methods can be applied to other areas of processing. Method 1800 can begin at step 1802, for example, after a flow route has already been determined to reduce an area of the microfluidic system chip. At step 1802 a component can be selected. At step 1804, the components can be shifted, individually, where each component is shifted to a second position. At step 1806 the channels can be rerouted based on the shifted component(s). At step 1808 it can be determined whether the route is legal (or practical). If not, the layout can be rejected at step 1812 and the layout can be reverted to the previous state or layout. If so, the layout can be accepted at step 1810. After either of steps 1810 or 1812, it can be determined if any components remain to be considered for movement to shrink the chip area. If so, Steps 1802 to 1812 can be repeated for each component. If not, the process can end at step 1816, resulting, in some examples, in a microfluidic chip layout having an area smaller than the area of the chip prior to performing method 1800.

Figure 19:
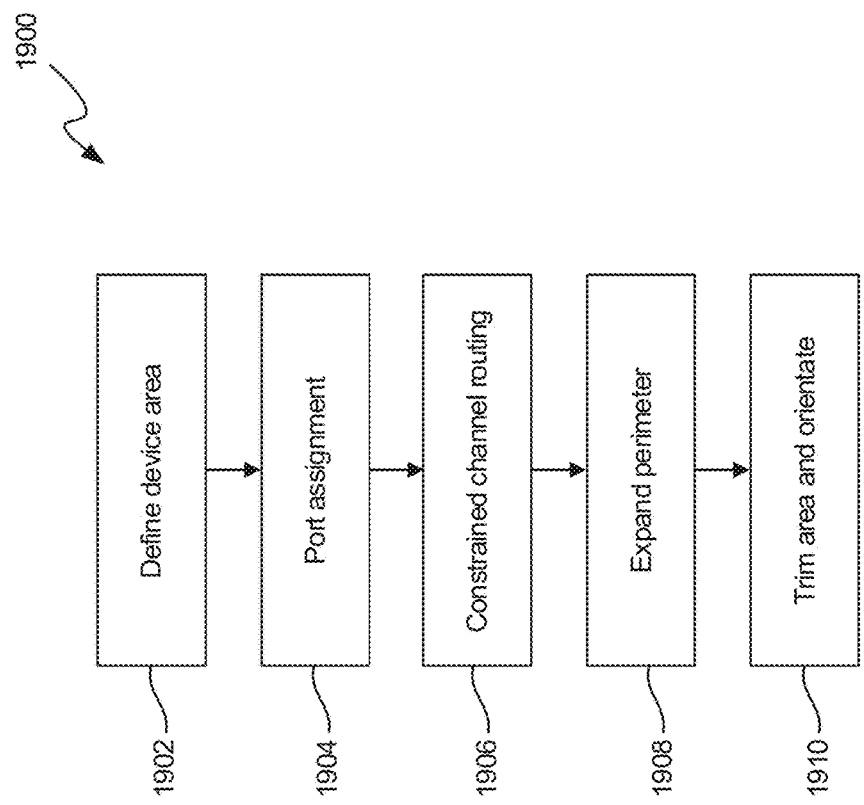
FIG. 19 is a flow chart of a method, in accordance with at least one embodiment of the present disclosure.

FIG. 19 is a flow chart of method 1900, in accordance with at least one embodiment of the present disclosure. At step 1902, a chip area can be defined around shifted components. For example, chip area A can be defined by length L and width W around components 802-812, as shown in FIGS. 8A-8B. In some examples, ports can be assigned simultaneously with flow routing of step 1906. In some examples, arbitrary ports can be assigned and in other examples, fixed ports can be assigned to the components. At step 1906, channels can be routed to intersect with perimeters of source and destination components and to avoid other components, the channel route to remain within the chip area. As shown in FIG. 11A, channel 1110 can be routed to intersect with perimeter of source component 1102 and a perimeter of destination component 1106 while avoiding the other components 1104 and 1108.

At step 1908, a perimeter, such as perimeter P of FIG. 11B can be expanded to accommodate components 802-812. In other examples, perimeter P can be later expanded to accommodate components 802-812 and the channels interconnecting the components. At step 1910, the area of the chip can be trimmed to the perimeter P and the chip can be reoriented so the length and width aligns with X and Y axes.

In another example, a source port located on a first component of the components can be assigned and a sink port located on a second component of the components can be assigned. Then, a port channel connecting the source port to the sink port can be routed based on locations of the source port and sink port, the first and second dimensions of the components, and locations of other channels.

In another example, a shift factor can be assigned to the components based on a distance between an expanded component of the components and the remaining components, based on dimensions of the expanded component, and based on the first and second dimension of the remaining components.

Figure 20:
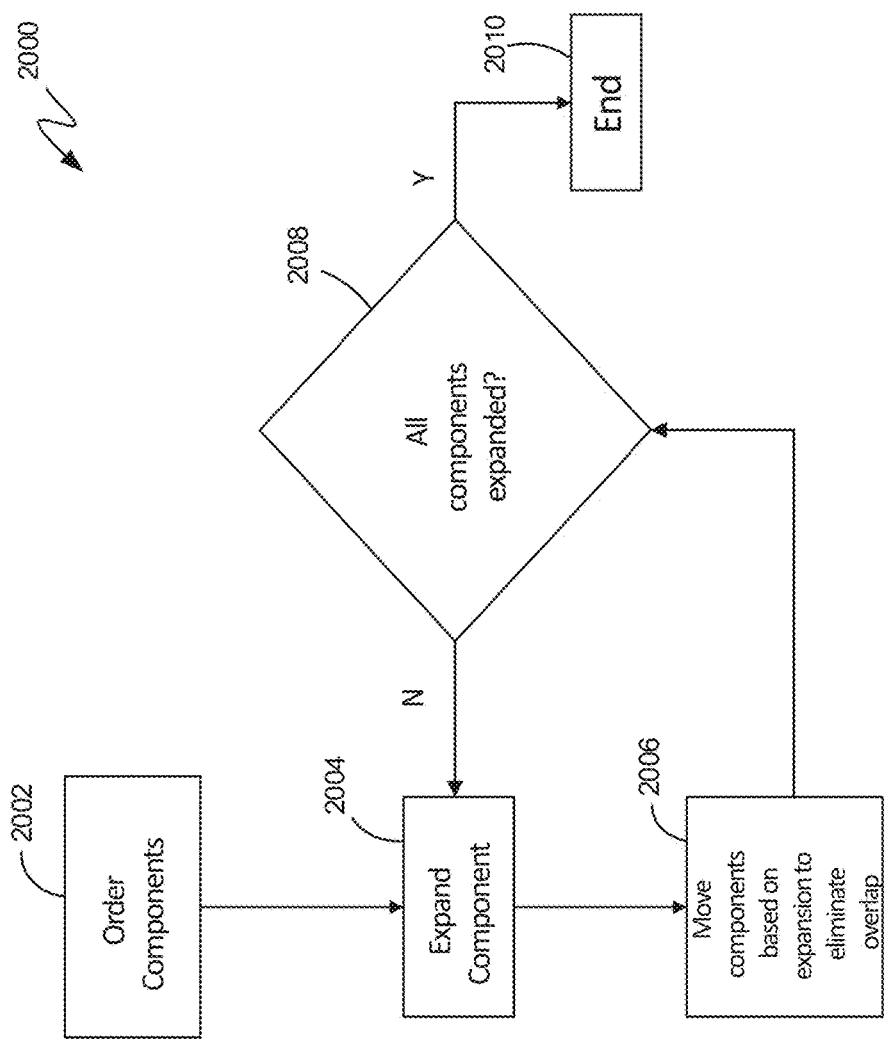
FIG. 20 is a flow chart of a method, in accordance with at least one embodiment of the present disclosure.

FIG. 20 is a flow chart of method 2000, in accordance with at least one embodiment of the present disclosure. At step 2002, components can be ordered. In some examples, the components can be ordered using circular propagation. For examples, the vertices C can be ordered C1-C5, as shown in FIG. 9.

At step 2004, the components can be expanded and at step 2006 the components can be moved based on expansion to eliminate overlap, as shown in FIG. 8A. At step 2008 it can be determined whether each component is expanded and/or moved. If not, steps 2004-2006 can be repeated as required. If so, the method can end at step 2010.

Figure 21:
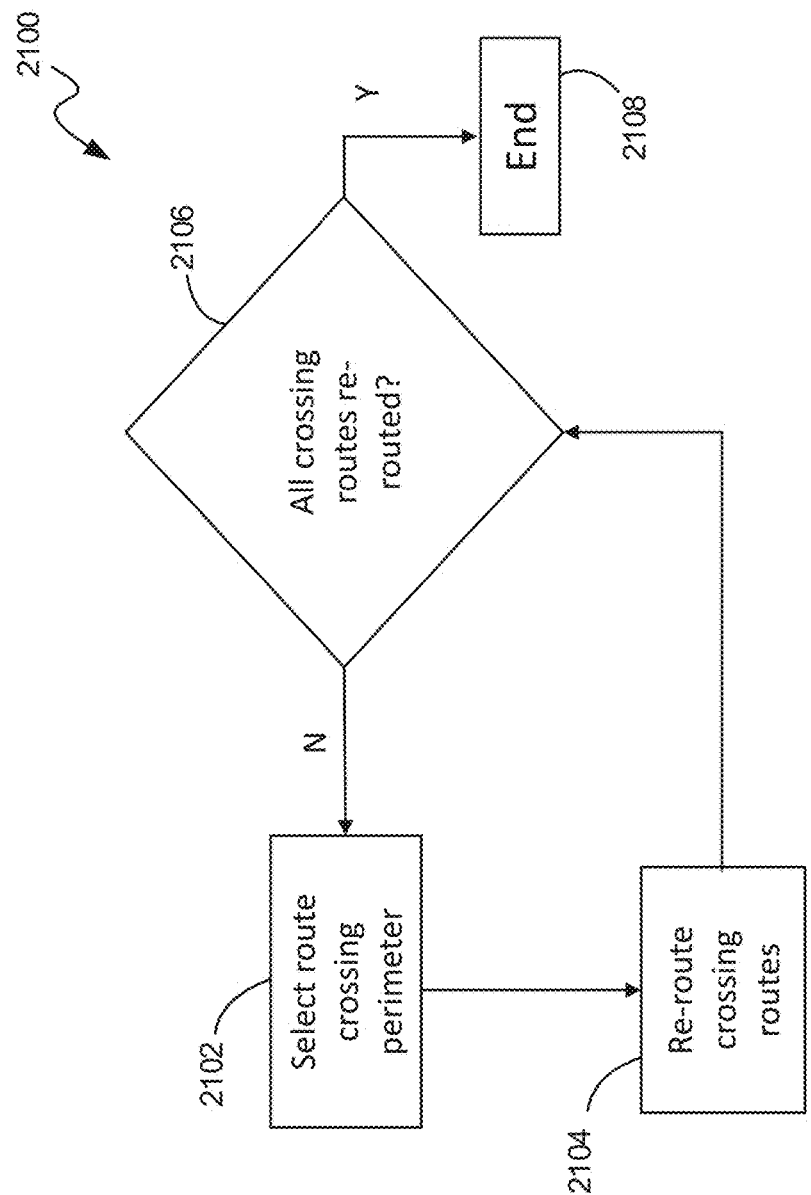
FIG. 21 is a flow chart of a method, in accordance with at least one embodiment of the present disclosure.

FIG. 21 is a flow chart of method 2100, in accordance with at least one embodiment of the present disclosure. At step 2102, routes that cross a perimeter (or that cannot be routed within a perimeter) can be selected and at step 2104 these channels can be rerouted such that they are allowed to cross the perimeter twice. In some examples, diagonal routing can be used and in other examples zig-zag routing along a diagonal can be used. Other routing techniques can be used in further examples. As shown in FIG. 11B, channels 1110 and 1112 are re-routed to be parallel with a diagonal perimeter, such as perimeter P of FIG. 8B.

At step 2106 it can be determined if all crossing routes have been re-routed. If not, steps 2102-2104 can be repeated as necessary until all routes are re-routed. If so, the method can end at step 2108.

In some examples, rerouting channels that intersect the perimeter can include rerouting with a route running substantially parallel to the perimeter, such as perimeter P of FIG. 8B, and to have only two intersections with the perimeter. In another example, the perimeter can be expanded to a second perimeter that encompasses the rerouted channels. For example, P2 of FIG. 8B can be a second perimeter that encompasses the components, routed channels and re-routed channels. In some examples, the area of the chip can be trimmed to the second perimeter.

Figure 22:
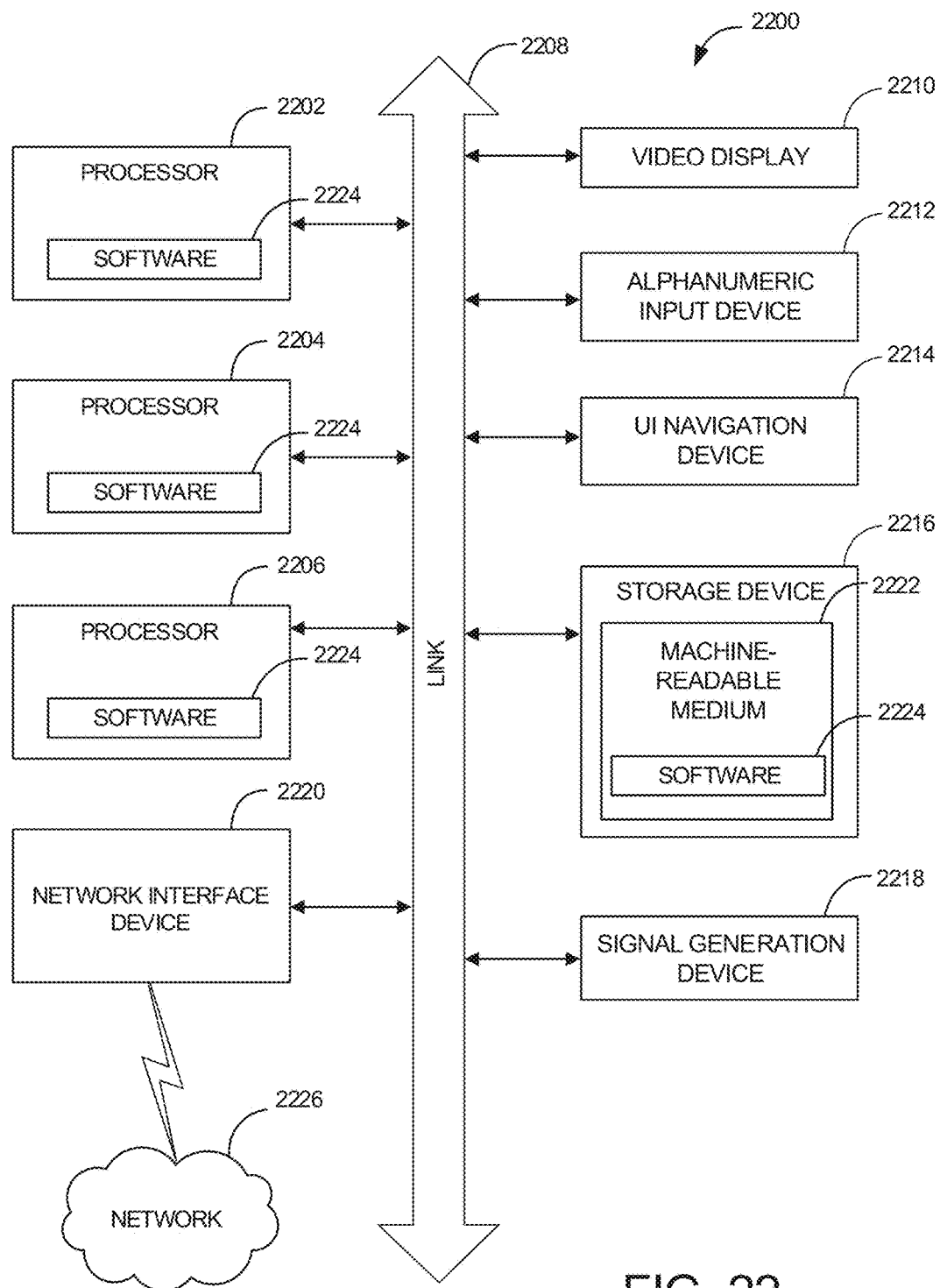
FIG. 22 is a schematic of a system, in accordance with at least one embodiment of the present disclosure.

FIG. 22 is a schematic of machine 2200 upon which any one or more of the techniques (e.g., methodologies) discussed herein may perform. In alternative embodiments, the machine 2200 may operate as a standalone device or may be connected (e.g., networked) to other machines. In a networked deployment, the machine 2200 may operate in the capacity of a server machine, a client machine, or both in server-client network environments. In an example, the machine 2200 may act as a peer machine in peer-to-peer (P2P) (or other distributed) network environment. The machine 2200 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer, or computer system) 2200 may include a hardware processor 2202 (e.g., a CPU. GPU, a hardware processor core, or any combination thereof), a main memory 2204, and a static memory 2206, some or all of which may communicate with each other via an interlink (e.g., bus) 2208. The machine 2200 may further include a display device 2210, an alphanumeric input device 2212 (e.g., a keyboard), and a user interface (UI) navigation device 2214 (e.g., a mouse). In an example, the display device 2210, input device 2212 and UI navigation device 2214 may be a touch screen display. The machine 2200 may additionally include a mass storage device (e.g., drive unit) 2216, a signal generation device 2218 (e.g., a speaker), a network interface device 2220, and one or more sensors 2221, such as a global positioning system (GPS) sensor, compass, accelerometer, or other sensor. The machine 2200 may include an output controller 2228, such as a serial (e.g., universal serial bus (USB), parallel, or other wired or wireless (e.g., infrared (IR)) connection to communicate or control one or more peripheral devices (e.g., a printer, card reader, etc.).

The mass storage device 2226 may include a machine readable medium 2222 on which is stored one or more sets of data structures or instructions 2224 (e.g., software) embodying or utilized by any one or more of the techniques or functions described herein. The instructions 2224 may also reside, completely or at least partially, within the main memory 2204, within static memory 2206, or within the hardware processor 2202 during execution thereof by the machine 2200. In an example, one or any combination of the hardware processor 2202, the main memory 2204, the static memory 2206, or the mass storage device 2216 may constitute machine readable media.

While the machine readable medium 2222 is illustrated as a single medium, the term "machine readable medium" may include a single medium or multiple media (e.g., a centralized or distributed database, and/or associated caches and servers) that arranged to store the one or more instructions 2224.

The term "machine readable medium" may include any medium that is capable of storing, encoding, or carrying instructions for execution by the machine 2200 and that cause the machine 2200 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2224 may further be transmitted or received over a communications network 2226 using a transmission medium via the network interface device 2220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi. IEEE 802.16 family of standards known as WiMAX®), peer-to-peer (P2P) networks, among others. In an example, the network interface device 2220 may include one or more physical jacks (e.g., Ethernet, coaxial, or phone jacks) or one or more antennas to connect to the communications network 2226. In an example, the network interface device 2220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2200, and includes digital or analog communications signals or other intangible medium to facilitate communication of such software.

Figure 3A:
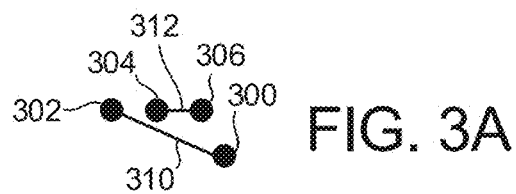
FIG. 3A is a schematic view of a portion of a microfluidic system in a first condition, in accordance with at least one embodiment of the present disclosure.
Figure 3B:
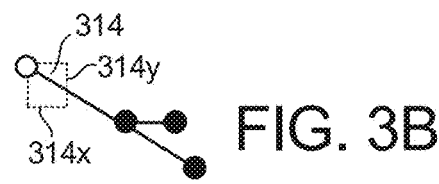
FIG. 3B is a schematic view of a portion of a microfluidic system in a second condition, in accordance with at least one embodiment of the present disclosure.
Figure 3C:
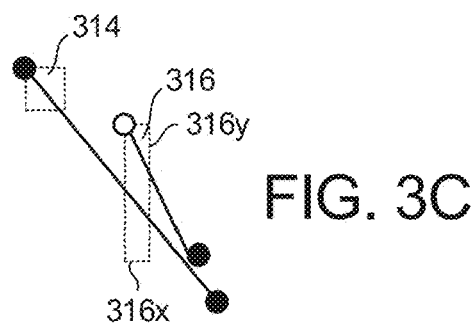
FIG. 3C is a schematic view of a portion of a microfluidic system in a third condition, in accordance with at least one embodiment of the present disclosure.
Figure 3D:
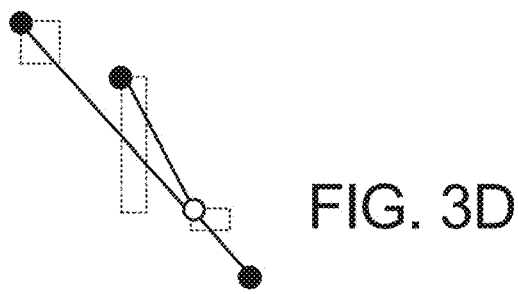
FIG. 3D is a schematic view of a portion of a microfluidic system in a fourth condition, in accordance with at least one embodiment of the present disclosure.
Figure 3E:
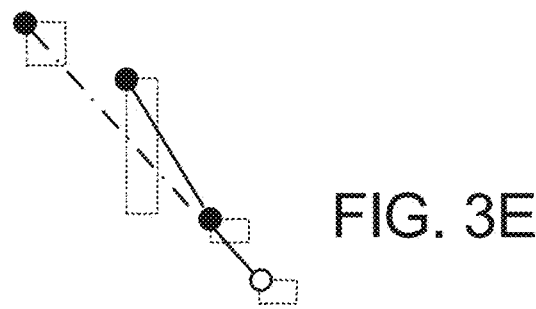
FIG. 3E is a schematic view of a portion of a microfluidic system in a fifth condition, in accordance with at least one embodiment of the present disclosure.
Figure 4A:
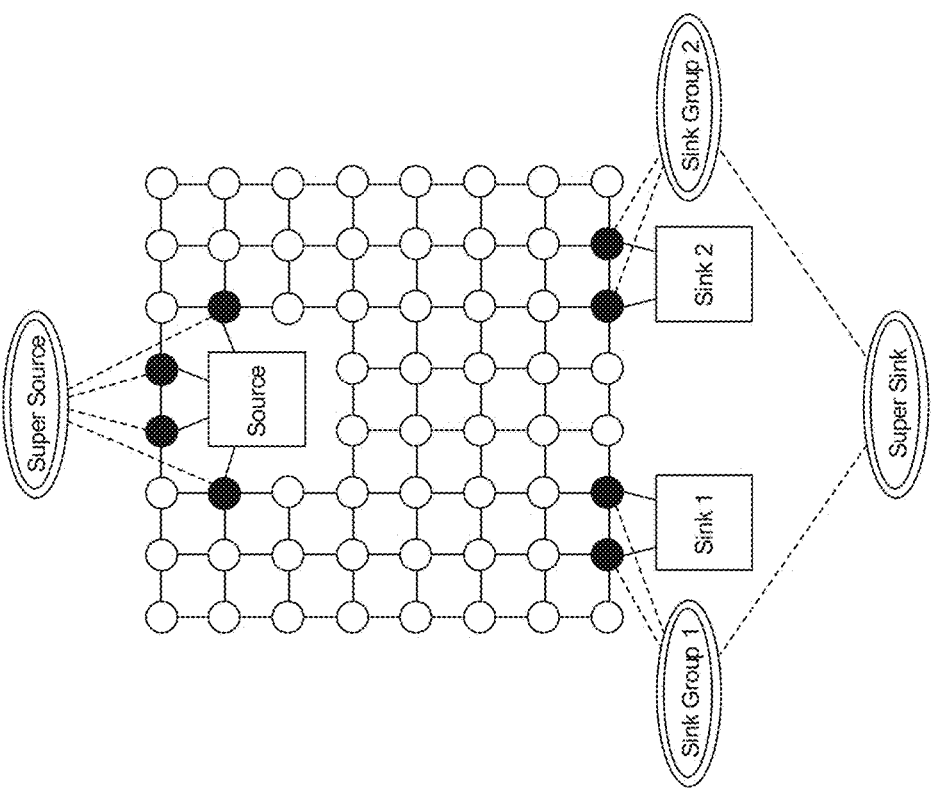
FIG. 4A is a schematic view of a microfluidic system, in accordance with at least one embodiment of the present disclosure.

In one example, machine 2200 can receive a machine-readable medium including instructions for developing a physical design layout of microfluidic system chip, which when executed by machine 2200, cause machine 2200 to receive a planarized graph of a netlist including vertices representing microfluidic components, as represented, for example in FIGS. 3A-3E. The machine 2220 can also be caused to expand the vertices into components, each component including a first dimension and a second dimension, as shown, for example in FIGS. 3A-3E, component 314 includes a first dimension 314X and a second dimension 314Y. The machine 2220 can also be caused shift the components to a position where the first and second dimension of each component do not overlap with the first dimension and the second dimension of any other component. As shown in FIG. 3A, component 316 including dimension 316x and 316y is shifted to avoid component 314.

The machine 2220 can also be caused to determine a flow route based on the first and second dimension of each component and the position of each component, the flow route including channels connecting two or more of the components. As shown in FIGS. 11A-11B, flow routes 1110 and 1112 can be placed to avoid other components. For example, flow route 1110 from component 1102 to component 1106 avoids components 1104 and 1108.

In another example, the machine 2220 can also be caused to assign a shift factor based on a distance between an expanded component of the components and the remaining components (as shown in FIGS. 10A-10D, for example), based on dimensions of the expanded component, and based on the first and second dimension of the remaining components.

In another example, the machine 2220 can also be caused to assign a source port located on a first component of the components; assign a sink port located on a second component of the components; and route a port channel connecting the source port to the sink port based on locations of the source port and sink port, the first and second dimensions of the components, and locations of other channels, as shown, for example, in Algorithm 3.

In another example, the machine 2220 can also be caused to shift, individually, each component to a second position after determining a flow route to reduce an area of the microfluidic system chip; and, reroute the channels to produce a second flow route based on the second position, as shown in FIGS. FIGS. 5A-5B and 11A-11B.

Further Notes and Examples

Continuous flow-based microfluidic devices have seen a huge increase in interest because of their ability to automate and miniaturize biochemistry and biological processes, as well as their promise of creating a programmable platform for chemical and biological experimentation. One major hurdle in the adoption of these types of devices is the design, which is largely done by hand using tools such as AutoCAD or SolidWorks, which require immense domain knowledge and can be hard to scale. This disclosure discusses the problem of automated physical design for continuous flow-based microfluidic very large scale integration (mVLSI) biochips, starting from a netlist specification of the flow layer.

In one example, an input for a physical design algorithm can be a planar netlist of components and their fluidic connections, a description of the target technology, and entities to be used. The netlist can be previously generated. The netlist can be treated as a graph where vertices are points. The netlist can be placed using a straight line planar embedding algorithm. Nodes can be expanded from points to two-dimensional components, based on their entity types. Flow channels between components can be routed using a router. A post-processing step can adjust a placement solution and can incrementally reroute the chip to reduce area and fluid routing channel length.

To further illustrate the apparatuses and systems disclosed herein, the following non-limiting examples are provided:

Example 1 is a method of developing a physical design layout of microfluidic system chip, the method comprising: receiving a planarized graph of a netlist including vertices representing microfluidic components; expanding the vertices into components, each component including a first dimension and a second dimension; shifting the components to a position where the first and second dimension of each component do not overlap with the first dimension and the second dimension of any other component; and determining a flow route based on the first and second dimension of each component and the position of each component, the flow route including channels connecting two or more of the components.

In Example 2, the subject matter of Example 1 optionally includes ordering the vertices before expanding the vertices.

In Example 3, the subject matter of any one or more of Examples 1-2 optionally include wherein determining the flow route is based on a set of grid points, the position of each component, the first and second dimensions of each component, and the location of each channel.

In Example 4, the subject matter of any one or more of Examples 1-3 optionally include shifting each component, individually, to a second position after determining a flow route, to reduce an area of the microfluidic system chip.

In Example 5, the subject matter of Example 4 optionally includes rerouting the channels to produce a second flow route based on the second position.

In Example 6, the subject matter of any one or more of Examples 1-5 optionally include producing a planar embedding using the planarized graph including the vertices.

In Example 7, the subject matter of any one or more of Examples 1-6 optionally include exporting the physical design layout including positions of the components and channel routes connecting the components; and adding a control layer to the physical design layout.

In Example 8, the subject matter of any one or more of Examples 1-7 optionally include wherein each component represents a microfluidic control device.

Example 9 is a method of developing a physical design layout of microfluidic system chip, the method comprising: receiving a planarized graph of a netlist including vertices representing microfluidic components; expanding the vertices into components, each component including a first dimension and a second dimension defining a component perimeter; shifting the components to a position where the first and second dimension of each component do not overlap with the first dimension and the second dimension of any other component; defining a chip area around the shifted components; and routing channels to intersect with perimeters of source and destination components and to avoid other components, the channel route to remain within the chip area.

In Example 10, the subject matter of any one or more of Examples 1-9 optionally include ordering the components using circular propagation.

In Example 11, the subject matter of any one or more of Examples 1-10 optionally include routing channels that cannot be routed within the perimeter such that they are allowed to cross the perimeter twice.

In Example 12, the subject matter of Example 11 optionally includes rerouting channels that intersect the perimeter to have a route running substantially parallel to the perimeter and to have only two intersections with the perimeter.

In Example 13, the subject matter of Example 12 optionally includes expanding the perimeter to a second perimeter that encompasses the rerouted channels.

In Example 14, the subject matter of Example 13 optionally includes trimming the chip area to the second perimeter.

In Example 15, the subject matter of any one or more of Examples 9-14 optionally include assigning a source port located on a first component of the components; assigning a sink port located on a second component of the components; and routing a port channel connecting the source port to the sink port based on locations of the source port and sink port, the first and second dimensions of the components, and locations of other channels.

In Example 16, the subject matter of any one or more of Examples 9-15 optionally include wherein shifting the components further comprises: assigning a shift factor based on a distance between an expanded component of the components and the remaining components, based on dimensions of the expanded component, and based on the first and second dimension of the remaining components.

Example 17 is a machine-readable medium including instructions, for developing a physical design layout of microfluidic system chip, which when executed by a machine, cause the machine to: receive a planarized graph of a netlist including vertices representing microfluidic components; expand the vertices into components, each component including a first dimension and a second dimension; shift the components to a position where the first and second dimension of each component do not overlap with the first dimension and the second dimension of any other component; and determine a flow route based on the first and second dimension of each component and the position of each component, the flow route including channels connecting two or more of the components.

In Example 18, the subject matter of Example 17 optionally includes the instructions to further cause the machine to: assign a shift factor based on a distance between an expanded component of the components and the remaining components, based on dimensions of the expanded component, and based on the first and second dimension of the remaining components.

In Example 19, the subject matter of any one or more of Examples 17-18 optionally include the instructions to further cause the machine to: assign a source port located on a first component of the components; assign a sink port located on a second component of the components; and route a port channel connecting the source port to the sink port based on locations of the source port and sink port, the first and second dimensions of the components, and locations of other channels.

In Example 20, the subject matter of any one or more of Examples 17-19 optionally include the instructions to further cause the machine to: shift, individually, each component to a second position after determining a flow route to reduce an area of the microfluidic system chip; and reroute the channels to produce a second flow route based on the second position.

In Example 21, the system, assembly, or method of any one of or any combination of Examples 1-21 is optionally configured such that all elements or options recited are available to use or select from.

These and other examples and features of the present apparatuses and systems will be set forth in part in the following Detailed Description. This Overview is intended to provide non-limiting examples of the present subject matter and it is not intended to provide an exclusive or exhaustive explanation. The Detailed Description below is included to provide further information about the present apparatuses and methods.

What is claimed is:

1. A method of developing a physical design layout of microfluidic system chip, the method comprising:
    receiving a planarized graph of a netlist including vertices representing microfluidic components;

expanding the vertices into components, each component including a first dimension and a second dimension;

shifting the components to a position where the first and second dimension of each component do not overlap with the first dimension and the second dimension of any other component; and determining a flow route based on the first and second dimension of each component and the position of each component, the flow route including channels connecting two or more of the components.

2. The method of claim 1, further comprising:
ordering the vertices before expanding the vertices.

3. The method of claim 1, wherein determining the flow route is based on a set of grid points, the position of each component, the first and second dimensions of each component, and the location of each channel.

4. The method of claim 1, further comprising:
shifting each component, individually, to a second position after determining a flow route, to reduce an area of the microfluidic system chip.

5. The method of claim 4, further comprising:
rerouting the channels to produce a second flow route based on the second position.

6. The method of claim 1, further comprising:
producing a planar embedding using the planarized graph including the vertices.

7. The method of claim 1, further comprising:
exporting the physical design layout including positions of the components and channel routes connecting the components; and
adding a control layer to the physical design layout.

8. The method of claim 1, wherein each component represents a microfluidic control device.

9. A method of developing a physical design layout of microfluidic system chip, the method comprising:
receiving a planarized graph of a netlist including vertices representing microfluidic components;
expanding the vertices into components, each component including a first dimension and a second dimension defining a component perimeter;
shifting the components to a position where the first and second dimension of each component do not overlap with the first dimension and the second dimension of any other component;
defining a chip area around the shifted components; and
routing channels to intersect with perimeters of source and destination components and to avoid other components, the channel route to remain within the chip area.

10. The method of claim 9, further comprising:
ordering the components using circular propagation.

11. The method of claim 9, further comprising:
routing channels that cannot be routed within the perimeter such that they are allowed to cross the perimeter twice.

12. The method of claim 11, further comprising:
rerouting channels that intersect the perimeter to have a route running substantially parallel to the perimeter and to have only two intersections with the perimeter.

13. The method of claim 12, further comprising:
expanding the perimeter to a second perimeter that encompasses the rerouted channels.

14. The method of claim 13, further comprises:
trimming the chip area to the second perimeter.

15. The method of claim 9, further comprising:
assigning a source port located on a first component of the components;
assigning a sink port located on a second component of the components; and
routing a port channel connecting the source port to the sink port based on locations of the source port and sink port, the first and second dimensions of the components, and locations of other channels.

16. The method of claim 9, wherein shifting the components further comprises:
assigning a shift factor based on a distance between an expanded component of the components and the remaining components, based on dimensions of the expanded component, and based on the first and second dimension of the remaining components.

17. A non-transitory machine-readable medium including instructions, for developing a physical design layout of microfluidic system chip, which when executed by a machine, cause the machine to:
receive a planarized graph of a netlist including vertices representing microfluidic components;
expand the vertices into components, each component including a first dimension and a second dimension;
shift the components to a position where the first and second dimension of each component do not overlap with the first dimension and the second dimension of any other component; and
determine a flow route based on the first and second dimension of each component and the position of each component, the flow route including channels connecting two or more of the components.

18. The non-transitory machine-readable medium of claim 17, the instructions to further cause the machine to:
assign a shift factor based on a distance between an expanded component of the components and the remaining components, based on dimensions of the expanded component, and based on the first and second dimension of the remaining components.

19. The non-transitory machine-readable medium of claim 17, the instructions to further cause the machine to:
assign a source port located on a first component of the components;
assign a sink port located on a second component of the components; and
route a port channel connecting the source port to the sink port based on locations of the source port and sink port, the first and second dimensions of the components, and locations of other channels.

20. The non-transitory machine-readable medium of claim 17, the instructions to further cause the machine to:
shift, individually, each component to a second position after determining a flow route to reduce an area of the microfluidic system chip; and
reroute the channels to produce a second flow route based on the second position.

* * * * *